US010660431B2

(12) United States Patent
Boucherie et al.

(10) Patent No.: US 10,660,431 B2
(45) Date of Patent: May 26, 2020

(54) METHOD AND DEVICE FOR PRODUCING A BRUSH

(71) Applicant: GB BOUCHERIE NV, Izegem (BE)

(72) Inventors: Bart Boucherie, Izegem (BE); Henk Vandenbussche, Sint-Eloois-Winkel (BE)

(73) Assignee: GB BOUCHERIE NV, Izegem (BE)

( * ) Notice: Subject to any disclaimer, the term of this patent is extended or adjusted under 35 U.S.C. 154(b) by 126 days.

(21) Appl. No.: 15/743,741

(22) PCT Filed: Jul. 13, 2016

(86) PCT No.: PCT/EP2016/066574
§ 371 (c)(1),
(2) Date: Jan. 11, 2018

(87) PCT Pub. No.: WO2017/009353
PCT Pub. Date: Jan. 19, 2017

(65) Prior Publication Data
US 2018/0199703 A1    Jul. 19, 2018

(30) Foreign Application Priority Data

Jul. 13, 2015  (BE) ................................. 2015/5446
Jan. 12, 2016  (BE) ................................. 2016/5018
Apr. 26, 2016  (DE) ........................ 10 2016 107 759

(51) Int. Cl.
*A46D 3/04*      (2006.01)
*A46D 3/08*      (2006.01)

(52) U.S. Cl.
CPC ............. *A46D 3/045* (2013.01); *A46D 3/082* (2013.01); *A46D 3/087* (2013.01); *A46B 2200/1066* (2013.01)

(58) Field of Classification Search
CPC ........ A46D 3/045; A46D 3/082; A46D 3/087; A46D 1/00; A46D 3/05; A46D 3/00; A46D 3/04; A46D 3/08; A46B 2200/1066; A46B 3/06
See application file for complete search history.

(56) References Cited

U.S. PATENT DOCUMENTS 2,647,019 A * 7/1953 Maynard .................. A46D 3/06
                                                           300/21
4,111,491 A * 9/1978 Steinebrunner ........ A46D 3/082
                                                           300/21
4,132,449 A * 1/1979 Bergman .................. A46B 3/06
                                                           300/21
4,635,313 A    1/1987 Fassler et al.
(Continued)

FOREIGN PATENT DOCUMENTS

CH              672579 A5    12/1989
CN            10284023 A     12/2012
(Continued)

*Primary Examiner* — Robert J Scruggs
(74) *Attorney, Agent, or Firm* — McNees, Wallace & Nurick LLC

(57) ABSTRACT

According to a method or an apparatus for fastening bristles in a bristle carrier (10) without using an anchor a heating (39) is provided in a tool part configured to transport the bristles. After inserting the bristles into anchoring openings (12) in the bristle carrier (10), the anchoring openings are closed by applying pressure.

76 Claims, 7 Drawing Sheets

(56) References Cited

U.S. PATENT DOCUMENTS

Figure 1:
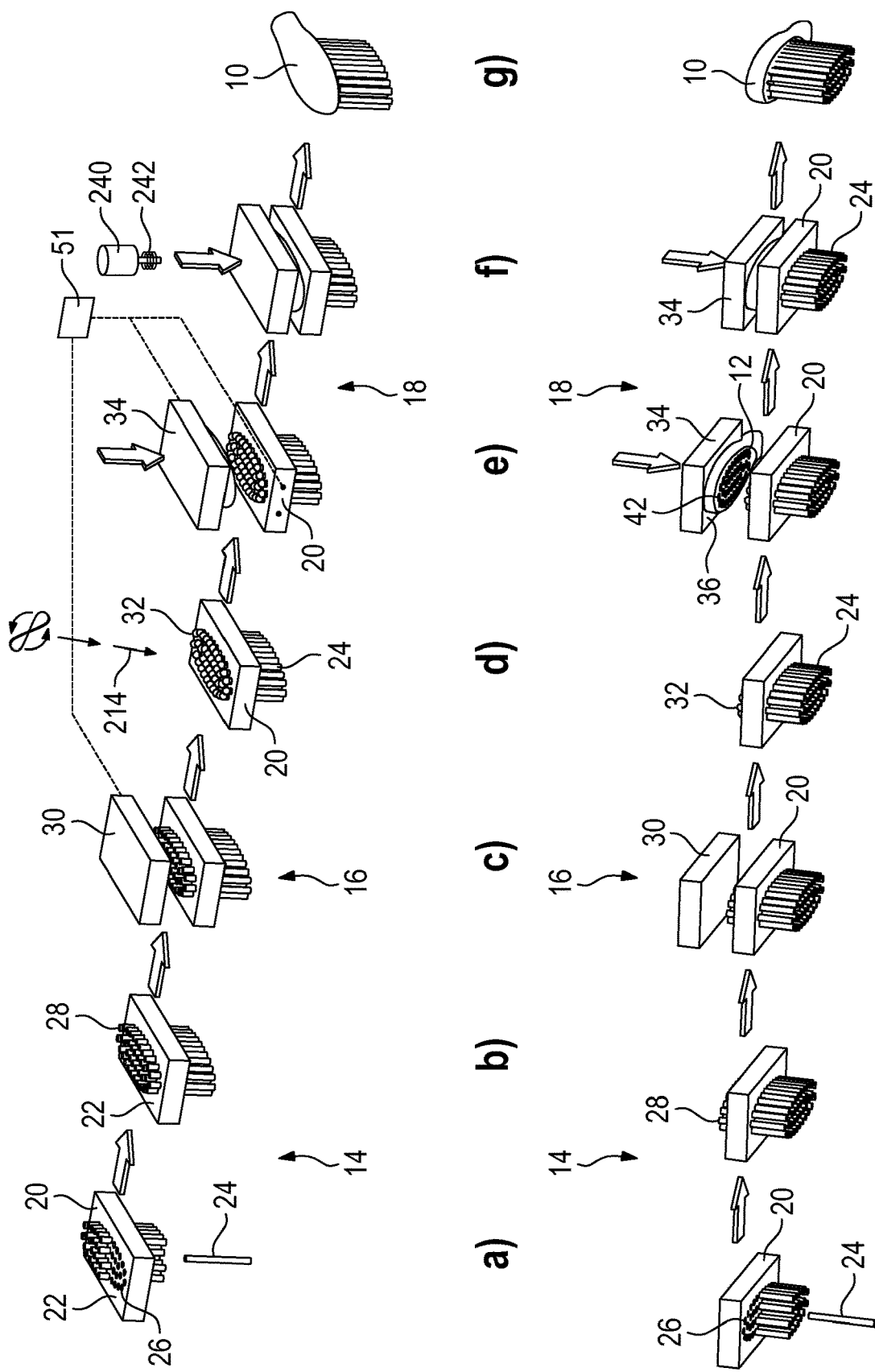

| | | | |
|---|---|---|---|
| 5,224,763 A * | 7/1993 | Dirksing | A46D 3/045 |
| | | | 300/21 |
| 5,622,411 A | 4/1997 | Weihrauch | |
| 6,558,434 B1 * | 5/2003 | Furrer | F25B 23/00 |
| | | | 23/295 R |
| 2001/0038237 A1 * | 11/2001 | Boucherie | A46B 3/06 |
| | | | 300/8 |
| 2003/0104161 A1 * | 6/2003 | Edwards | A46B 3/04 |
| | | | 428/85 |
| 2010/0088836 A1 * | 4/2010 | Kirchhofer | A46B 5/0025 |
| | | | 15/167.1 |
| 2012/0317737 A1 * | 12/2012 | Birk | A46B 3/06 |
| | | | 15/106 |
| 2015/0150367 A1 * | 6/2015 | Moskovich | A46B 9/04 |
| | | | 15/167.1 |
| 2015/0190957 A1 * | 7/2015 | Boucherie | B29C 45/162 |
| | | | 425/589 |

FOREIGN PATENT DOCUMENTS

| | | |
|---|---|---|
| DE | 3422623 A1 | 12/1985 |
| DE | 19853030 A1 | 5/2000 |
| EP | 0355412 A1 | 2/1990 |
| EP | 0472557 A1 | 3/1992 |
| EP | 0472857 A1 | 3/1992 |
| EP | 2078472 A1 | 7/2009 |
| EP | 2078472 B1 | 2/2010 |
| EP | 2674061 A1 | 12/2013 |
| JP | S60116303 A | 6/1985 |
| JP | 2011131087 A | 7/2011 |
| WO | 90/14400 A1 | 11/1990 |

* cited by examiner

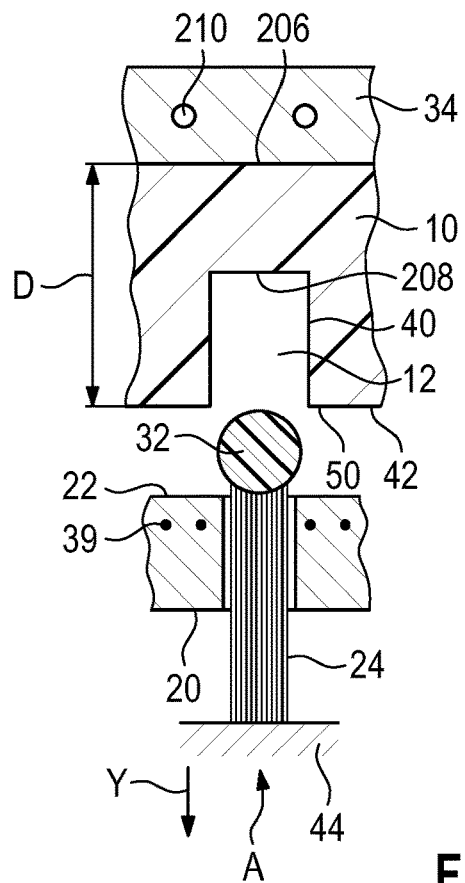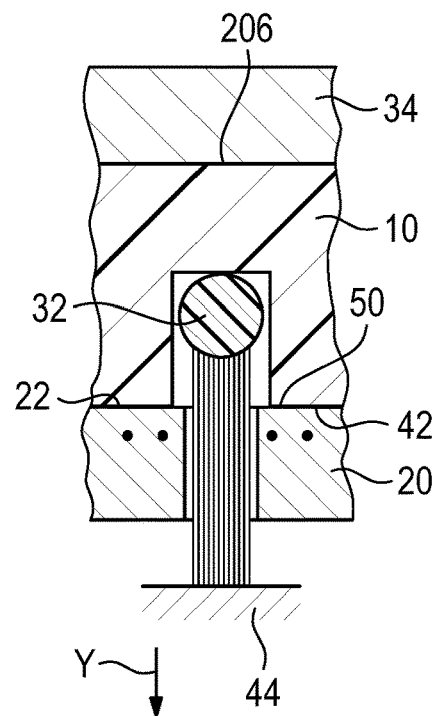
Fig. 3
Fig. 4
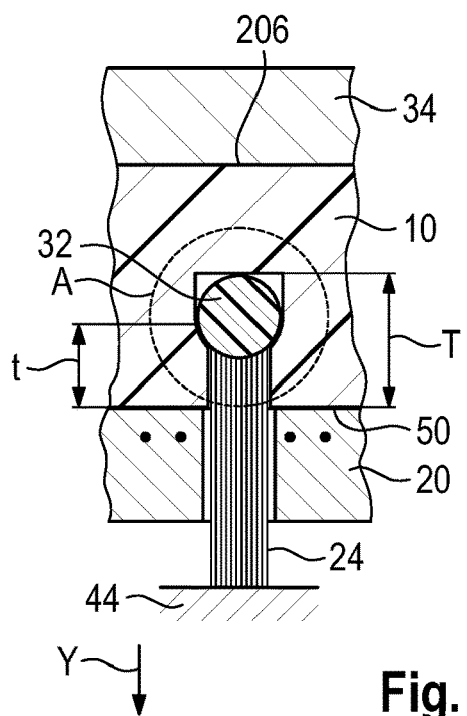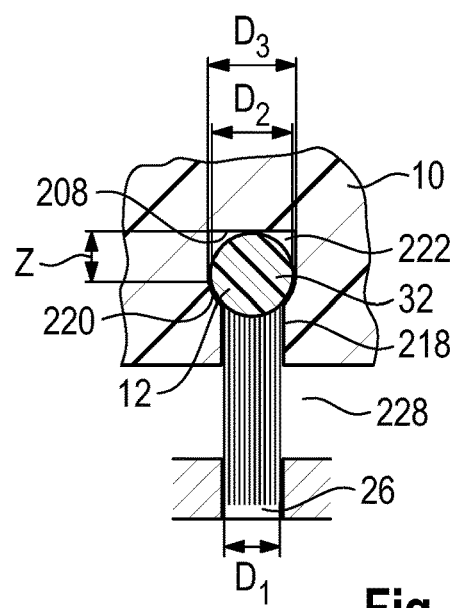
Fig. 5
Fig. 5A

METHOD AND DEVICE FOR PRODUCING A BRUSH

FIELD OF THE INVENTION

The invention relates to a method and apparatus for producing a brush, which comprises a bristle carrier made of thermoplastic resin having at least one anchoring opening, in which at least one bristle is inserted and anchored therein.

BACKGROUND OF THE INVENTION

For producing brushes, in particular toothbrushes, but also brushes for use in the household, two methods are prevailing in the field, that is the fastening of the bristle tufts by using an anchor (small metal plates or wire loop) or without using an anchor. As opposed to using an anchor, in the anchor-free method the bristle tuft is not folded and fastened in the bristle carrier on the folding location thereof, but is fixed with an end thereof at the bristle carrier by gluing or thermal processing. According to a common method prevailing in the field, the bristle carrier has openings through which the bristle tufts are inserted. The bristle tufts then protrude with the back side thereof from the openings and are heated on the back side of the bristle carrier. The thermoplastic material of the bristles is thus melting, whereby the bristles fuses materially with each other, and this results in a thickening, thus it is not possible to pull-off single bristles towards the front side. In general, said plurality of bristle tufts are liquified on the back side by using hot air or a hot punch, so that the material of the respective bristle tufts merges into each other and creates a kind of layer made of the liquified bristle ends on the back side thereof. This back side is then covered, in particular overmoulded.

The disadvantage of this solution is that due to the required covering of the back side a considerable additional effort is required regarding the method and the apparatus. However, it is to be noted that especially for toothbrushes the transition surfaces between adjacent layers have to be formed without gaps as far as possible to eliminate hygienic problems.

The term "bristle carrier" is to denote the part of the final brush, which carries the bristle or the bristle tufts. The bristle carrier may thus form the complete brush body, for a toothbrush this is the integrally injection moulded part made of handle, neck and head, or also only a pre-manufactured part of the later brush body. In the latter case, the bristle carrier is generally a thin plate made of thermoplastic resin, which is provided with one or more openings for stuffing it with one or more bristles or bristle tufts. After stuffing and fastening of the bristles, the plate-like bristle carrier is then either inserted in the pre-manufactured bristle body, which for example includes a respective recess for the plate-like bristle carrier. Alternatively to this, and this is the usual case, the plate-like bristle carrier is overmoulded and thus results in a bristle body composed of the prefabricated bristle carrier and an injection moulded rest.

CH 672 579 A5 proposes a method for fastening bristle tufts in the bristle carrier by means of a small anchor plate. This means, the bristle tuft is folded, and the small anchor plate, which presses itself in the wall of the anchoring opening, is arranged in the folding area, and thus the bristle tuft is finally fixed on the bristle carrier. However, in order to close the opening on the front face or the front side of the bristle carrier in a more refined way, so that no bacteria or spores may find a hold and may proliferate, a bead around the bristle carrier, which surrounds the anchoring opening and protrudes from the front face, is to be pressed inwards. However, the bristle tuft itself is not fastened by this reshaping of the bead, but by the anchor itself. The single bristle tufts are subsequently punched into the bristle carrier by using a stuffing tool, which pushes the folded bristle tufts through a pipe. The pipe itself may then have a heating device on the front face thereof, which is only abutting on the bead and causes it to melt or plasticize, and subsequently presses the bead radially inwards.

In addition to the possibilities of an anchorless fastening of the bristle or the bristle tuft on the bristle carrier mentioned above, as second method has been developed in theory, which however has never been realized, that is striking the bristle tufts into the bristle carrier, which includes openings and which is preheated. After striking the bristle tufts into the soft bristle carrier, the bristle carrier is exposed to pressure by means of a press on the front side of the bristle carrier, from which front side the bristle tufts are protruding, so that the soft material around the rim of openings is compressed and the cross-sections of the openings are reduced. Referring to this, some concepts will be presented in the following.

In DE 198 53 030 A1 the bristle tufts comprise bristles, which are fused together to form a thickening, on the back side thereof. The bristle carriers include openings, in which cylinder-shaped protrusions of a heating are introduced before striking the bristle tufts without contacting the rim of the opening. By this radiation heat the inward rim of the openings is locally heated. The bristle carrier is heated in the region of the rim to a structure-changing temperature, for example the softening temperature. By means of this temperature increase, the hole is to be reduced in its cross-section, thus the bristle tuft has to penetrate into the wall during striking. After removing the heating device, the bristle tufts are then striked into the openings by using the thickened ends thereof, wherein the cross-section of the thickening is larger than the cross-section of the opening, so that the thickening penetrates into the soft portion of the rim, which defines the opening and encompasses it, that is in the respective wall. Then the front surface of the bristle carrier is reshaped by using the punch, thus the material of the bristle carrier is pressed against the bristle tufts and anchors them.

From U.S. Pat. No. 5,224,763 a similar method is known, where a bristle carrier includes a bead-like protruding rim of the opening. Here also the rim of the opening is heated by means of a pin-shaped heating element protruding into the opening or by using hot air. The cross-section of the opening itself is smaller than the thickened end of the bristle tufts, thus it is fixed after striking into the wall of the soft opening. Then the support for the bristle tufts compresses the heated circumferential bead, so that additional material is available to close the opening on the transition to the front face of the bristle carrier.

From EP 0 355 412 A1 a method is known, where the thickened end of the bristle tuft and/or the rim of the opening in the bristle carrier are heated, wherein the dimensions and temperatures are selected in a way, that after striking the thickened end, the rim of the opening presses inwards and thus encompasses the thickened end similar to a snap fit and receives the thickened end in a form-fitting way.

EP 0 472 557 B1 proposes to penetrate in a plate-shaped bristle carrier made of resin by using a heated punch, which includes pins, thus the pins form openings for receiving the bristle tufts. The bristle tufts are then pushed into the punched openings, which are still hot, and the melting is raised around the thickening of the bristle tufts. Furthermore, a die plate may be pressed against the upper side of the bristle carrier, in order to also shape the melting. Here it is especially preferred, that on the upper side of the not yet reshaped bristle carrier protrusions or beads are projecting, which form material, that is available as material, which is pressed towards the opening.

In the method according to DE 34 22 623 A1 a bristle carrier, which is plate-shaped and is configured without openings, is fused with bristle tufts consisting of the same plastic material as the bristle carrier. A heating tool is moved between the sides of the bristle carrier and of the bristle tufts, which have not yet been fused together, thus both are fused. Then, the bristle tufts are pressed into the molten material of the bristle carrier.

SUMMARY OF THE INVENTION

It is an objective of the invention to provide a significantly less complex method for producing a brush, which particularly requires less effort with regard to the apparatus, but at the same time provides a secure anchoring of the bristle or the bristle tuft in the anchoring opening.

The object is achieved by a method for producing a brush, which comprises a bristle carrier made from thermoplastic resin having a front side and a back side and at least one anchoring opening, in which at least one bristle made of thermoplastic resin is inserted and anchored therein without using an anchor, thus it protrudes from the front side of the bristle carrier, characterized by the following steps:

the at least one bristle is accommodated in a receiving opening of a tool part, the at least one bristle is pushed with the fastening end thereof, while it is still located in the receiving opening, into an anchoring opening in the bristle carrier, which has been formed during producing the bristle carrier, the distance of the tool part to the bristle carrier is reduced, thus the tool part contacts the bristle carrier, the front side of the bristle carrier is heated to a temperature below the melting temperature of the bristle material and/or of the bristle carrier material, in particular to a maximum of 85% in ° C. of the respective melting temperature of the bristle and/or the bristle carrier material, the tool part applies a pressure force on the heated bristle carrier, and reshapes the bristle carrier at least in the region of the rim, which is encompassing the anchoring opening, by reducing the cross-section of the anchoring opening in a way, that the at least one bristle is embedded and anchored in the anchoring opening, and the distance of the tool part to the bristle carrier is enlarged, thus the at least one bristle is pulled out of the receiving opening.

The heating of the bristle carrier on the front side is preferably performed by the tool part, which is heated. If the front face of the tool part contacts the front side for some seconds, as this is the case in the preferred variant, then the temperature of the front face of the tool part also corresponds to the temperature on the front side of the bristle carrier, thus the two temperatures correspond to each other. This means, the front face of the tool part is heated to a temperature below the melting temperature of the bristle material and/or of the bristle carrier material, in particular to maximum 85% in ° C. of the respective melting temperature of the bristle material and/or the bristle carrier material.

The method steps mentioned above are preferably performed in the order mentioned above, but this is not mandatory. For example, the front side of the bristle carrier may also be heated first, and then the distance of the tool part to the bristle carrier may be reduced, or both steps may be performed at the same time or partly at the same time.

The change in distance is performed by a relative movement of the tool part to the holder part, that is, the tool part may be moved, then the holder part does not move or vice versa, or tool part and holder part are both moving.

When in the following "at least one bristle" is used, this is intended to denote one single bristle, which is located in a receiving opening and an anchoring opening, bristles of a single bristle tuft, which are located in a receiving opening and an anchoring opening, and also several bristle tufts, which are located in the receiving openings and anchoring openings thereof, thus the invention is not limited to the anchoring of a single bristle or single bristles being spaced from each other. In addition, when bristle tufts will also be mentioned on same places in the following to enhance reading, the invention may basically be used for a bristle carrier having one or more single bristles and also for a bristle carrier having one or more bristle tufts or combinations hereof. This in addition also relates to the process claims and apparatus claims.

The bristle carrier including the anchoring opening is a pre-manufactured injection moulded part, so that it is very easy to produce and no reworking is required. The anchoring openings are preferably produced already during injection.

In the following, a plurality of enhancements will be described, which are inventions by themselves, which when combined with each other also represent improvements. It has to be noted, that the apparatus, which will be described later, may also be provided with features described in the context of the method, wherein only the controller has to be programmed correspondingly.

Due to the heating, a holder, which accommodates the bristle carrier, may for example be heated by radiation during operation. In addition, the period of time during which a pressure force is applied on the bristle carrier may have a sufficient length that the bristle carrier is heated too much on positions deeper and more remote from the front side and thus may also be reshaped in said deeper regions, as extensive tests have shown. In order to prevent this, according to a variant of the invention, the back side of the bristle carrier is actively cooled while the pressure force is applied on the bristle carrier. This means, a separate cooling device is provided, for example by a liquid cooling. Thus, the volume range of the bristle carrier, in which a sufficient high-temperature for reshaping during application of the pressure exists, may be set within smaller boundaries. In addition, a security zone within the bristle carrier is created by the cooling device, where no reshaping takes place.

During application of the pressure force, the back side of the bristle carrier is actively cooled. Preferably, it is ensured here, that the bristle carrier is heated during the process up to a maximum of 25° C.

The holder mentioned above, by means of which a counter force is applied on the bristle carrier on the back side and onto which the bristle carrier abuts, is actively cooled, in particular by using a liquid cooling.

The cooling may not only be performed on the back side of the bristle carrier, but optionally also on portions of the so-called side surface of the bristle carrier. The side surface is the surface which connects the front side and the back side of the bristle carrier. Due to the cooling, it is prevented that when the bristle carrier is squeezed between front side and back side, the side surface is laterally plastically reshaped towards the outside. Here for example, the holder may comprise a receiving recess for the bristle carrier, which is formed in a complementary way to the bristle carrier and ensures an abutment of the back side and the side surface on the holder.

The pressure force is applied in an apparatus, when the bristle carrier is contacted by the tool part on the front side and by a holder on the back side, while the pressure force is applied on the bristle carrier. In particular, the apparatus is moved to stop in order to apply the pressure force. That means, there is no distance between the holder and the tool part, as they contact each other on the front faces thereof. Preferably, this contact is made on the complete area and around the enclosed bristle carrier in a parting plane between holder and tool part. Thus, the cavity, which is formed between the holder and the tool part for receiving the bristle carrier, is sealed in the parting plane. Here, now bristle carrier material may move into the gap to form a ridge on the completed bristle carrier.

As has surprisingly shown during tests, the stability and precision of the bristle carrier and the alignment of the at least one bristle, in particular the bristles of a bristle tuft, may be increased, when the apparatus is not immediately moved apart and the bristle carrier is not immediately removed after the so-called application time (period of time, during which pressure is applied on the bristle carrier between front side and back side). Although being very disadvantageously regarding the cycle time, a ventilation gap is generated between the front side and the tool part after the application time. That means, tool part and holder will be slightly removed from each other. Here, the apparatus is not completely moved apart, and also not brought into a position, in which the bristle carrier is removed or may be removed. A rest period is integrated for the bristle carrier including its at least one bristle, preferably one or more bristle tufts, in which the ventilation gap in the apparatus serves to cool the front side. In this rest period, depending on the shape of the holder, the back side may further contact the side surface, which results in a shape-stabilizing effect.

The predetermined rest period should at least be 1 second, in particular at least 1.5 seconds. Preferably, during this time no other movement between the holder and the tool part is performed. Alternatively, a slow opening movement may be performed.

It is especially advantageous, when the at least one bristle, in particular the one or more bristle tufts, remain in the associated receiving opening over the complete rest period. The receiving opening retains the shape of the bristle(s) of one or more bristle tufts during the rest period. Here, the region around the anchoring opening becomes more stable. Obviously, internal stresses are reduced.

The ventilation gap should have a height of at least 1 mm, which is measured in the movement direction of the apparatus (movement direction between holder and tool part during opening and closing movement of the apparatus).

As mentioned above, preferably the ventilation gap may be held constant during the rest period.

Optionally, cooling air may be blown via the ventilation gap to the front side of the bristle carrier. Thus, the duration of the rest period may be shortened.

A further characteristic of the invention is that after a feed motion of the tool part and the bristle carrier relative to each other, which is completed by reaching a closed position of the apparatus, the pressure force is applied on the bristle carrier in the closed position during a predetermined application time. Despite the intention to keep the cycle times as short as possible, according to this characteristic feature of the invention the apparatus is thus not moved into the closed position and immediately opened again, as this is normally the case during pressing, reshaping or punching of articles. The pressure force is not required to be constant during the application time, as it depends on the resistance of bristle carrier. With increasing reshaping of the bristle carrier, the pressure force will thus decline.

The dwell time should at least be 1 second, in particular at least 1.5 seconds.

Dwell times of maximum 3 seconds, in particular maximum 2.5 seconds, have proven to be the optimum. More is not required.

The bristle carrier may be heated on the front side during the dwell time, in particular during the whole dwell time, however optionally also already during the feed motion on the front side. In case heating is already performed during the feed motion, cycle time may be reduced. In addition, the front side is already heated during the feed motion, for example by radiation. As soon as the front side contacts the heated tool part, the front side and the bristle carrier are heated and brought to the desired temperature during the subsequent closing of the apparatus.

The pressure application time on the bristle carrier is determined by the sum of the application time plus the period of time of the feed motion, in which the front side is contacted by the tool part and at the same time the back side is contacted by the holder for the first time and is compressed until reaching the completely closed position. The application time is to at least be 4 seconds, in particular at least 5 seconds.

As maximum application time of 15 seconds, in particular maximum 10 seconds, have proven to be the limit.

Here, the dwell time is preferably smaller than the period of moving together mentioned above, in which the bristle carrier is compressed. Said moving together and compressing is performed with a very slow feed motion of the holder in relation to the tool part. In particular, this period of time lasts at least 3, in particular at least 4 seconds.

Tests have shown, that the dwell time is at maximum 50%, in particular maximum 40% of the period above during moving together, while the bristle carrier is compressed.

In order to reduce the cycle time, it may be advantageous to heat the front side of the bristle carrier already by other measures and not only by contact with the tool part. The bristle carrier may be preheated. For example, if the bristle carrier is already positioned in the holder, heated air may be blown onto the front side thereof or the bristle carrier may be exposed to a heating source (for example radiation heat), which does not form the tool part. This may be carried out during the feed motion of the tool part to the holder or prior to said feed motion. Thus, the bristle carrier may be preheated, for example during an adjusting movement of the holder/the tool part or before the tool part is laterally moved to the holder. The subsequent heating time by contact with the tool part may thus be reduced.

A further characteristic of the invention is that the free end of the at least one bristle in the apparatus is supported on the front face thereof. This support has to set the axial position of the bristle or of the bristles within one or more bristle tufts within the same bristle or of bristle tufts in relation to one another. For a plurality of bristle tufts, the bristle may for example have the shape of a saw tooth on the ends of the bristle tuft seen in a side view. Other options comprise that a bristle tuft is formed in saw-tooth-shape, is tapering to a point or is conically tapering.

It would be expected, that the support, which acts as stop or shaping means should also act during application of the pressure force on the bristle carrier, in order to prevent any movements of the bristle, the bristles or the bristle tufts at this time. However, it has shown, that it is advantageous to remove the support at least during application of the pressure force on the bristle carrier, preferably even before application of the pressure force or during the feed motion of the apparatus after contacting the front side and the back side of the bristle carrier by tool or holder. That means, the support, which has been inserted before, is removed, at least in the last phase of pressure force application, optionally also during the complete application time of the pressure force. The minimum pressure, which is transferred on the bristles by the support at least in the last phase or also during the complete phase of the reshaping process, may cause a reshaping of the bristles and may also cause the bristles to be inclined or not to be aligned parallel to each other, also not within a bristle tuft.

In this context it may be advantageous that the cross-section of the at least one bristle and the cross-section of the associated receiving opening in the tool part are aligned in a way that the at least one bristle/bristle tuft is clamped into the receiving opening and may be positioned axially by means of the clamping. When the bristle or bristles of a bristle tuft are aligned axially, they are clamped into the receiving opening and thus positioned in the axial direction. Of course this clamping is only a minimum clamping, which in general enables a movement in the process of axially alignment, which is carried out before. However, by the own weight of the bristle/the bristle tuft or also due to inertia during movements of the apparatus, no automatic or undesired movement of the bristle/bristle tuft in the receiving opening occurs.

Similarly, as it is the case in the anchorless fixing used in the field, at least one bristle or the complete bristle tuft may get a thickened fastening end by means of thermal reshaping of the bristle material by heating it above the melting temperature. When using a bristle tuft, the bristles of the bristle tuft will be fused by thermal reshaping. However here, no adjacent bristle tufts are further fused with each other, but each bristle tuft has a thickened fastening end of its own, by means of the tip of which it is inserted into the anchoring opening.

By means of the invention not only bristle tufts may be fastened in the anchoring opening by reshaping the rim of the opening, but also pre-manufactured so-called elastomeric cleaning elements (for example made of thermoplastic resins), which have a multiple thickness of the usual filaments of bristle tufts. Said cleaning elements serve to enhance the cleaning and also, for a toothbrush, the massage of the gingival. In addition, the cleaning elements do not need to have the shape of a pin, but may have any cross-sections, in particular elongated, arc-shaped, cross-shaped or round (circular or oval) shapes and also the corresponding annular forms including central openings.

The at least one anchoring opening may be filled with a single pre-manufactured bristle made from an elastomer material, in particular a thermoplastic elastomer (TPE). Said single bristle is anchored in the anchoring opening by reshaping of the bristle carrier.

Preferably, the single pre-manufactured bristle has a largest wall thickness, as measured in the cross-section, which is larger than 0.6 mm, in particular larger than 0.9 mm. For example, for a rectangular cross-section shape, the largest wall thickness is measured in the longitudinal direction.

Optionally, the single pre-manufactured bristle may have a thickened fastening end, by means of which it is inserted into the anchoring opening and which is engaged by the reshaped rim of the anchoring opening of the bristle carrier. The thickened fastening end is generated during production of a single bristle and not by impressing and elastically reshaping the bristle by reshaping the rim of the anchoring opening. However, alternatively, it would also be possible to eliminate the thickened fastening end, in case the bristle has a sufficient thickness and the rim will be pressed into the resilient bristle, so that the fastening end is then thickened by the displaced material.

The thickened fastening end has for example the shape of a flat cylinder and/or the single, pre-manufactured bristle is a multicomponent injection moulded part. In this context, the thickened fastening end may for example be of another, preferably harder material, for example polypropylene, than at least the outer top surface of the single pre-manufactured bristle outside of the anchoring opening. Preferably, the fasting end is even harder than the complete rest of the single, pre-manufactured bristle. Due to the harder fastening end, the seat of the bristle in the anchoring opening is enhanced.

Usually, a plurality of anchoring openings are provided in the bristle carrier, wherein the at least one, preferably more anchoring openings are only provided with the single pre-defined bristle(s). At least another, preferably all of the other anchoring openings are however provided with pre-manufactured bristle tufts, so that the brush comprises a mixture of conventional bristle tufts and thicker elastomeric cleaning elements.

The single bristle protrudes with its free end, for example, at least to the free end of the bristle tuft, as seen in a side view, thus it is not shorter than the bristle tufts. It may be advantageous, when the elastomeric cleaning elements, that is the single bristles, are even longer than the bristle tufts and protrude on the front side beyond the ends thereof. The elastomeric cleaning elements may of course also be shorter than the bristle tufts.

A further characteristic of the invention is that the wall, which defines the anchoring opening in the bristle carrier, abuts only in sections on the fastening end of the at least one bristle or the at least one complete bristle tuft arranged in the anchoring opening after reshaping. The fasting end may thus also be a thickened end or the thickened fastening end of a bristle tuft, in which the bristles merge into each other integrally as one unit. It should be expected, that the complete anchoring opening abuts on the fastening end as close-fitting and gap-free as possible, in order to prevent any movement of the bristle or of the bristle tuft in any direction. However, the invention takes a different approach. The fastening end is not compressed completely, but has some clearances within the anchoring opening. Hereby, the position of the at least one bristle, in particular however the bristles within a bristle tuft, may be adjusted more accurately. In case, for example, the thickened end of a bristle tuft is compressed completely, the bristles will try to force apart from each other and thus have no parallel alignment to each other anymore.

For example, the reshaping should only be carried out in the region of the rim of the anchoring opening, that is, in the region of that portion of the wall, which lies in the region of the mouth of the anchoring opening.

Regarding the final brush, the wall of the anchoring opening does not clamp the fastening end of the bristle or of the at least one complete bristle tuft over a depth of at least 0.8 mm and/or also does not reshape the fastening end. This region, where no clamping and/or no reshaping of the fastening end is carried out, starts at the bottom of the anchoring opening and extends further over the at least 0.8 mm towards the front side of the bristle carrier.

Even a ventilation gap may be provided between the wall and the at least one bristle/bristle tuft, in particular in the area of the bottom or adjacent to the bottom of the anchoring opening.

As mentioned above, the at least one bristle or the at least one complete bristle tuft may have a thickened fastening end. The rim of the anchoring opening is reshaped, that is the region of the wall, which is located in the region of the mouth towards the front side. In this region, the rim is constricted so, that the anchoring opening is enlarged towards the bottom and the thickened fastening end is engaged by the reshaped rim from behind in the pullout direction, thus pulling out of the bristle/bristle tufts is prevented by the rim acting as a stop.

Regarding the precision of the alignment of the bristle or of the bristles of a bristle tuft, which have been mentioned above, the thickened fastening end may be clamped in the anchoring opening starting from its end next to the front side of the bristle carrier in the axial direction to the back side along only a maximum of 50% of its total axial length. In case the fastening end is a sphere, for example, as it is normally generated during melting of the bristle ends, only a maximum of this half of the sphere is clamped in the anchoring opening, which faces towards the front side.

The constricted "neck" of the anchoring opening adjacent to the mouth formed by reshaping, that is, the reshaped rim of the anchoring opening engaging with the thickened fastening end from behind may for example have an axial extension (in the context of the invention "axial" always denotes the direction of the front side to the back side or from the back side to the front side) of 0.5-1.3 mm, in particular 0.6-0.9 mm. This is an extremely low height.

The brushes produced by the invention, in particular toothbrushes, may have a very low thickness in the area of the bristle carrier due to the invention. While in the state of the art the thickness of toothbrushes in the area of the head is larger than 4 mm, a thickness of below 4 mm is archived by the invention, plus better fixing forces for the bristle or bristle tufts than in the state of the art. In addition, due to the invention it is possible to position bristle tufts, also larger bristle tufts, very close to the rim of the front side, which has not been possible up to now.

Bristle tufts may be also constricted in cross-section by reshaping the rim of the anchoring opening. That means, a bristle tuft is fastened in the anchoring opening, and the rim of the anchoring opening is reshaped in a way that the rim of the bristle tuft is compacted in an area, in which the bristles are arranged side by side. The region, in which the bristles are arranged side by side, preferably abuts directly on the fastening end, which is formed by the fused bristles. The bristle tuft thus gets a smaller cross-section after reshaping and constricting of the anchoring opening as the bristle tuft had before after inserting the bristle tuft in the anchoring opening.

Preferably, it is provided that the bristle tuft is compacted by at least 3%, in particular by at least 5%. Said compaction is defined by the difference of the cross-section, that is the difference of the cross-section area, the receiving opening in the tool part to the cross-section of the reshaped anchoring opening in the region of the rim, that is, the mouth of the anchoring opening to the front side.

However, for toothbrushes, the cross-section is only reduced by maximum 0.4 mm.

Preferably, before reshaping the anchoring opening has only an excess of less than 0.2 mm as compared to the largest cross-section of the fastening end of the tuft/the bristle in order to enable the insertion of the fastening end into the anchoring opening without applying any force. After reshaping, the constricted rim of the anchoring opening results in a formfitting, where the cross-section of the rim may only be narrower about 0.1 to 0.3 mm than the largest cross-section of the fastening end. This minimum excess length is sufficient to realize excellent pull-out values.

The invention also enables to process bristle carriers having already elastomers injection moulded on the back side thereof. The elastomer is thus already injection moulded on the back side of the bristle carrier, when the bristle/bristle tuft is inserted into the anchoring opening from the front side. The holder, in which the bristle carrier is received during application of the pressure force, includes a recess. This recess is formed in a way that it receives the bristle carrier on the back side including the elastomer. In particular, the shape of the recess may be complementary to that of the bristle carrier provided with the overmoulding. As the elastomer is embodied for toothbrushes as tongue cleaner having protruding knobs, the holder comprises depressions for these knobs, which are formed in a correspondingly complementary way.

Preferably however, the depth of the recess is formed such that the volume thereof for receiving the elastomer is smaller than the uncompressed volume of the elastomer. Due to this the volume in the reception is adapted to the actual volume of the compressed elastomer during application of the pressure force in order to reshape the rim of the anchoring opening. As the elastomer is softer than the bristle carrier, it has to be prevented that the pressure force becomes too low due to the interposed elastomer.

The counter force applied by the holder during reshaping may be completely transferred to the front part of the bristle carrier through the elastomer. Thus, a direct contact of the back side of the bristle carrier with the holder without interposing the elastomer is not required to transfer counter forces to the bristle carrier.

The numerous options of the method according to the invention mentioned above, may comprise the following enhanced steps:

The tool part is heated, so that the front face of the tool part opposite of the bristle carrier is heated to a temperature below the melting temperature of the bristle material and/or of the bristle carrier material, in particular below 85% in ° C. of the respective melting temperature of the bristle and/or the bristle carrier material. The tool part is moved relative to the bristle carrier, so that the tool part contacts the bristle carrier and heats it.

According to a further aspect, the method according to the invention for producing a brush, which comprises a bristle carrier including at least one anchoring opening and at least one bristle inserted into the anchoring opening and anchored therein without using an anchor, wherein the bristle carrier and the at least one bristle is formed of a thermoplastic resin, which may be the same or may be of a different kind, is further enhanced by the following steps:

A front face of the tool part opposite of the bristle carrier is heated to a predetermined temperature, which lies in a range of between the ambient temperature and 210° C., in particular 150° C.;

the tool part is moved relative to the bristle carrier, so that the tool part contacts the bristle carrier and heats it to a predetermined temperature, however without melting the bristle carrier and the at least one bristle.

In any embodiments the thermoplastic resin is preferably selected from a group consisting of polyester, in particular polyethylene terephthalate (PET), preferably BR003, and polybutylene terephthalate (PBT), polypropylene (PP), polycarbonate (PC), polyamide (PA), polyvinyl acetate (PVA), polyethylene (PE), acrylnitrile-butadiene-styrene-copolymer (ABS), and styrene-acrylnitrile-copolymer (SAN). Homopolymers and also copolymers may be used with the thermoplastic resins mentioned above.

According to the invention, the bristle carrier and the at least one bristle inserted into the tool part are not to melt, when the tool part contacts the bristle carrier. Here, the predetermined temperature is preferably at maximum 85% of the melting temperature of the thermoplastic resin. Thus, a damage of the bristles and/or the bristle carrier may definitely be prevented.

Preferably, the predetermined temperature lies in the range between 30° C. and 150° C., more preferred between 60° C. and 140° C., in particular between 90 and 130° C., or 100 and 115° C.

Further preferred, the predetermined temperature is above the glass transition temperature of the thermoplastic resin. Thus, a sufficient reshapability of the thermoplastic resin is ensured.

The method according to the invention differs basically from the state of the art, as on the one hand it provides an exclusively anchorless fastening of the bristle, the bristle tuft or the bristle tufts. The anchoring opening is pre-manufactured, that means that no heated punches are used to press holes into the bristle carrier, rather the receiving openings are already generated during injection moulding of the bristle carrier. Furthermore, the receiving opening on the inner side is not heated first, and thus the rim on the inner side of the opening is softened, so that the bristle or the bristle tuft is pressed into the soft wall of the receiving opening. Rather, the bristle or the bristle tuft(s) is preferably first inserted into the receiving opening, and then the bristle carrier is subsequently heated on the front side thereof opposite of the tool part without melting. The process is carried out below the melting temperature of the bristle material and/or of the bristle carrier material, wherein the heating is performed by the tool part, in which the bristle or the bristle tuft is located, and not by a separate dedicated heating tool, which then has to be moved apart, when the bristle or the bristle tuft is fed in. Such a heating by the tool part itself, in which the bristle or the bristle tuft is located, is thus neither intended nor may be induced by the state of the art, as the bristle tuft of the state of the art had to penetrate into the softened, heated wall of the bristle carrier and thus had to have a high inherent stability in order to transfer the pressure force applied on the bristle tuft. Only due to the pressure force applied on the bristle tuft from the back side and the inherent stiffness of the cold bristle tuft it had been possible to press the anchoring end in the softened wall of the bristle carrier. In addition, the heating is performed by contacting the bristle carrier by the heating tool part itself and not by touchless heating as it is prevailing in the state of the art. Thus, on the one hand, energy transitions may be faster achieved, and on the other hand the apparatus may be realized by using fewer parts.

During the complete reshaping process, the bristle carrier is heated to a temperature below the melting temperature, preferably to a temperature which is significantly below the melting temperature, for example at least 15% below the respective melting temperature calculated in ° C., and preferably at maximum 15° over the glass transition temperature expressed in ° K, and for a bristle carrier material having a glass transition temperature higher or equal 300° K. For a bristle material having a glass transition temperature of below 300° K, the temperature to which the bristle carrier is heated during the complete reshaping process is at maximum 50% above the glass transition temperature calculated in ° K. Preferably, the bristle carrier is heated to a temperature above the glass transition temperature.

The invention and the advantageous variants described above and in the following are based on in particular the usage of polypropylene as bristle carrier material, from which some groups have a glass transition temperature of below 300° K, others have a glass transition temperature of above 300° K. Other preferred bristle carrier materials are PET, PBT, PA, ABS, SAN, and PC. All of these bristle carrier materials have glass transition temperatures of above 300° K.

The glass transition temperature may be identified by dynamic mechanic thermal analysis (DMTA), for example. For semi-crystalline thermoplasts the melting temperature is regarded as the upper end of the melting range. An identification of the melting temperature may for example be performed by dynamic difference calorimetry (DSC). For amorph thermoplasts, the transition from the flow to the processing range is considered as melting temperature.

As the cycle times for producing bristle carriers are quite short, according to one embodiment of the invention the tool part is heated before it contacts the bristle carrier. This of course has the drawback that the bristle or the bristle tuft itself is already heated hereby, which was not intended in a state of the art, as the bristle tuft had to press itself into the soft wall. According to the invention, the tool part may be heated to its predetermined maximum operating temperature, before it contacts the bristle carrier.

Amongst others, according to an embodiment of the invention, the invention provides that the melting temperature of the resin of the bristle carrier is below the melting temperature of the bristle or bristles. However, there are also brushes, where the bristle carrier material is the same as the bristle material, for example polypropylene and PA.

As described above, the bristle carrier only should be heated after inserting the at least one bristle by the tool part, and preferably only by contacting. Of course, a minimum rise of temperature may occur in case a bristle carrier gets close to a warm or hot tool part, but this temperature rise is of no significance at all, and occurs only on the direct surface thereof.

However, in case the duration of the feed motion is very long, it is conceivable as alternative that the tool part heats the bristle carrier in the area of the contact area by means of the tool during the feed motion of the tool part to the temperature, which is below the melting temperature of the bristle carrier material and preferably higher than or equal to the glass transition temperature of the material of the bristle carrier. As an alternative or in a complementary way, the bristle carrier may also be heated by the tool part by contacting the bristle carrier to the temperature mentioned above.

According to an embodiment of the invention, the heating of the bristle carrier to the predetermined temperatures or ranges of temperature mentioned above, should penetrate 0.25-0.5 mm under the surface of the bristle carrier (front side) facing the tool part, until the reshaping operation is completed. As the tool part is pressed against the bristle carrier over a longer period of time and thus heats it, the heating energy also penetrates deeper into the inner side of the bristle carrier. For this reason, the tool part needs not to be heated very deeply at the first contact of the bristle carrier by the tool part, it is sufficient that the heating is achieved during the feed motion and the application time (contact period).

In the first phase of the feed motion relative to the bristle carrier, the tool part may heat the bristle carrier at least in a region of the rim encompassing the anchoring opening, however preferably in the complete contact area, to a temperature above a threshold temperature, which is 60% in ° C., in particular 80% of the glass transition temperature of the bristle carrier material, when a bristle carrier material having a glass transition temperature higher or equal 300° C. is used. This relates in particular to bristle carrier materials like variants of polypropylene having a glass transition temperature higher or equal 300° K, PET, PBT, PA, ABS, SAN, and PC. Alternatively, the threshold temperature is the ambient temperature, in case a bristle carrier material is used which class transition temperature is below 300° K, which in particular is the case when variants of polypropylene are used, which have such low glass transition temperatures. The heating is performed before the tool part reshapes the rim in a second phase of the feed motion, and the rim presses against the at least one bristle.

The bristle carrier material may in particular be heated to a temperature which is in a range between the glass transition temperature and below about 85% of the melting temperature of the thermoplast calculated in ° C. Depending on the thermoplastic material used, the temperature is preferably in a range between 30° C. and 210° C., more preferred between 60° C. and 140° C., preferably between 90 and 130° C., or 100 and 115° C.

As tests have shown, the bristle or bristle tuft is to be first pushed into the receiving opening, before the tool part contacts the bristle carrier, in particular before the bristle carrier has been heated at least in the region of the rim encompassing the anchoring opening (preferably the complete contact surface) to a temperature above a threshold temperature, which is 40% in ° C., in particular 20% in ° C., below the glass transition temperature of the bristle carrier material, when a bristle carrier material is used having a glass transition temperature higher or equal 300° Kelvin (this in particular relates to bristle carrier materials like polyproplene variants having a glass transition temperature of higher or equal 300° K, PET, PBT, PA, ABS, SAN and PC), or which equals the ambient temperature, when a bristle carrier material is used having a glass transition temperature less than 300° K, that is in particular variants of polypropylene having such low glass transition temperatures. The rim of the anchoring opening is at least the outer rim on the front side of the bristle carrier, In another variant of the invention, the at least one bristle or bristle tuft is first pushed into the anchoring opening, before the rim of the anchoring opening is heated to a temperature of at least 30° C. above the ambient temperature, in particular before the rim of the anchoring opening at the inner side of the anchoring opening is heated above ambient temperature by the tool part. That means, the rim inside the opening is not heated noticeably in the last variant as opposed to the state of the art, where heatable pins are to penetrate into the opening to heat the inner rim of the opening, that is, the wall defining the opening, up to the bottom of the hole.

The reshaping should be of such a kind, that the rim of the bristle carrier presses against the outer bristles of the fastened bristle tufts on the transition to the front side or front face of the bristle carrier along the complete periphery, so that the bristle tuft is compacted. Of course, the kind and the amount of the compaction depends on the cross-section of the bristle tuft. For toothbrushes, the cross-section of the anchoring opening is for example reduced by a maximum of 0.3 mm, preferably by a maximum of 0.15 mm.

Preferably, the absence of heating of the opening wall also refers to the other embodiments. That means, that optionally in general only in the area of the front side, that is on the transition of the front side to the anchoring opening, the rim is heated to the predetermined threshold temperatures or temperatures, however the ambient temperature is basically kept in the opening as long as the tool part does not contact the bristle carrier.

According to a preferred embodiment of the invention, the tool part is also heated in the complete contact area, where the tool part contacts the bristle carrier, and not only in the point-shaped region or line-shaped region around the rim of the anchoring opening. This has the advantage, that the tool part may use the complete contact area and thus the complete adjacent material area of the tool part to move and reshape said material area by the applied high pressure. In addition, it is advantageous, when the tool part contacts the complete front face of the bristle carrier facing the tool part, that is the front side thereof, but at least 70% of the area of the front side and exposure pressure thereon. In the state of the art, a kind of collar has been created at the produced bristle carrier due to the projecting beads, which has been the only heated and reshaped material. The present invention is very different hereto, as especially the portions of the bristle carrier are heated and reshaped, which are positioned remote of the front face rim of the anchoring openings.

The back side of the bristle carrier should not be heated by the tool part during anchoring, so that only the front side facing the tool part is de-facto heated and reshaped, whereas the back side forms a plate-like stable structure, which may be denoted as base of the bristle carrier. This part of the bristle carrier is thus also not reshaped or changed in shape during the exposure to pressure.

The tool part may also heat the bristle carrier at the front face thereof, at least for the complete period of time of applying pressure on the bristle carrier. Thus, the invention does not aim to preheat the bristle carrier in brief time and subsequently move the bristle tufts rapidly in the heated material portions of the bristle carrier, as it is the case in the state of the art by means of the preheated bristle carriers, in which the bristle tufts are then striked into.

The resins used in the present invention are for example copyester, in particular Eastar™ BR003 (having a melting temperature range of 230-280° C.), polypropylene, in particular a homopolymer as for example PPH5042 having a melting temperature of 165° C., polycarbonate, polyamide, polyvinyl acetate, or polyethylene. In case these materials have a glass transition temperature above the ambient temperature, here 300° K, energy is to be transferred into the bristle carrier via the tool part. This is also advantageous for materials, where the glass transition temperature is below the ambient temperature. However, according to a variant of the invention for such materials of the bristle carrier it is also possible to eliminate heating of the bristle carrier by the tool part. Then, the reshaping is exclusively realized by the pressure of the tool part on the bristle carrier at ambient temperature.

Advantageously, in the method according to the invention and by the apparatus according to the invention, which will be described in the following, bristle carrier materials will be heated to the following temperatures:

| Bristle carrier material | Melting temperature [° C.] | Glass transition temperature [° C.] | Process temperature [° C.] |
| --- | --- | --- | --- |
| Polypropylene | 160°-170° | −10°-0° | <136° |
| PET | 260° | 70° | <120° |

-continued

| Bristle carrier material | Melting temperature [° C.] | Glass transition temperature [° C.] | Process temperature [° C.] |
|---|---|---|---|
| PBT | 220° | 47° | <95° |
| PA | 200°-260° | 50-60° | <98° |
| ABS | 220°-250° | 95° | <150° |
| PC | 220°-230° | 148° | <210° |
| SAN | 200° | 108° | <165° |

According to the invention, in particular for PET, a heating of the front side of the bristle carrier is provided in a range of 75-95° C., in particular 80-90° C., and for PP from 115-125° C., in particular 110-120° C.

In particular, PP having a melt flow index (MFI) of 6-35, preferably 10-15, is used.

In the preferred embodiment, the method according to the invention does not only provide a bristle, which is inserted in a receiving opening as a whole, but a plurality of anchoring openings and a plurality of receiving openings in the bristle carrier and in the tool part, respectively. The receiving openings are aligned with the assigned anchoring openings. Bristle tufts are then inserted in the receiving openings, which are then inserted into the anchoring openings, preferably inserted at the same time. The tool part concurrently heats at least the rims of the anchoring openings, preferably the complete contact area, so that the complete area between the anchoring openings is heated. By applying pressure on the front side of the bristle carrier, the anchoring openings are concurrently closed and thus the bristle tufts are anchored at the same time.

Preferably, the contact area between the tool part and the bristle carrier on the tool part is planar, just as the front side of the bristle carrier, which faces the tool part.

The feed movement of the tool part relative to the bristle carrier may be performed in a pressure and time controlled and/or a pressure and path controlled way.

Alternatively to this, the apparatus is simply moved to stop, by providing an electric motor, for example (for example, via a spindle drive), wherein the consumption of power or energy of the electric motor is detected and when a predetermined threshold is reached, it is assumed that the apparatus is in the closed position, in which the holder and the tool part preferably contact each other. At this point of time the so-called dwell time may start.

The term "movement or feed motion of the tool part in relation to the bristle carrier" denotes that one of the two parts or both parts are moving relative to one another.

According to a further variant of the invention, starting at the time of contacting the bristle carrier, the tool part applies a pressure force, which is preferably kept constant, on the bristle carrier over of predetermined period of time. Said optional method is especially easy to realize, because a pressure force is simply generated and applied on the bristle carrier for a period of time, as so-called application time, in order to subsequently remove the tool part and the bristle carrier from each other. Here, like in the other variants of the invention, no additional method steps are required to anchor the bristle or the bristle tuft(s) in the bristle carrier.

The feed motion and/or the applied pressure from the tool part relative to or onto the bristle carrier may be carried out from the first contact of the bristle carrier by the tool part until the maximum feed path is reached in a non-linear way over time. This way, a longer or shorter initial application time of the temperature may be realized, for example, and subsequently another pressure is applied to reshape the bristle carrier material further and permanently.

As opposed to the state of the art mentioned above, during insertion in the associated anchoring opening(s), the fastening end of the at least one bristle or of the complete bristle tuft(s) may be smaller than the cross-section of the anchoring opening, of course before the reshaping thereof and before heating the bristle carrier. That means, the bristle tuft is not pushed into the side wall of the anchoring opening, as it has been proposed in the state of the art. The fastening end is also not pressed into the bottom of the anchoring opening, as it is not heated or not heated in a sufficient degree in order to be soft. In addition, no axial force is applied on the bristles, which exceeds the required force for pushing the bristles out of the receiving opening.

The quite long application time of the tool part on the bristle carrier, while pressure is applied on the bristle carrier and it is also heated is vital for the present method, and represents a considerable difference to the state of the art. The application time amounts to at least 4 seconds, in particular at least 5 seconds, and at maximum 15 seconds, in particular at maximum 10 seconds. Over this long application time, the pressure may be the same and/or a permanent heating of the bristle carrier may be carried out. The anchoring opening may be a blind hole, in particular having a depth of at maximum 4 mm, further in particular at maximum 2.7 mm.

As the bristle carrier is reshaped in the region of the front side, the thickness of the bristle carrier is reduced by the method according to the invention.

The anchoring opening is only reshaped and constricted up to a depth of maximum 85%, in particular maximum 70%, in particular even only maximum 60% of its total depth, that means, it will not be tapered in the area of the bottom of the blind hole.

A significant further difference to the state of the art is also the applied pressure, which is significantly higher than in the methods proposed so far. That is to say, the tool part is applying a pressure of at least 200 bar, in particular at least 400 bar, on the bristle carrier.

The at least one anchoring opening, preferably all anchoring openings, have no protruding collar before impingement of the bristle carrier by the tool part in the area of the mouth of the anchoring opening, rather the bristle carriers are planar on the front side thereof facing the tool part, at least in the contact area with the tool part. The very high pressure of 200 bar and more ensures that the complete area of the surface or contact surface is reshaped and no protruding collar is required as material collection, apart from one exception, which will be described in the following.

In case the anchoring opening comprises a rim portion on the inner side thereof, which is extending in an inclined way to the front side thereof opposite to the tool part, an additional material collection may be necessary in this area. Then, before impingement of the bristle carrier by the tool part, the bristle carrier has a protrusion on the front face rim in the region of the inclined rim portion, which projects opposite to the front side towards the tool part. Apart from that, the front side of the bristle carrier is advantageously completely plain.

As tool part in particular a magazine is used, which is loaded with the at least one bristle or the at least one bristle tuft. In case a plurality of bristles or a plurality of bristle tufts have to be fastened on the bristle carrier, thus all bristles or bristle tufts are accommodated in the same magazine and are all concurrently inserted after loading.

After loading, the fastening end(s) of the bristle or bristle tufts protrude(s) from the magazine with the fastening end thereof and will be heated on said fastening end without having to be removed from the magazine. The thickening is then generated on the fastening end, which protrudes freely from the magazine. The magazine is thus no dedicated punching tool, but also a transport tool, which is laterally moved from a loading station to the bristle carrier and is subsequently pressed against the bristle carrier.

The thickening, that is, the thickened fastening end, may then be actively cooled, that is, directly after its creation, before it is inserted into the anchoring opening in the bristle carrier. This leads to an increased cycle time. In addition, a subsequent reshaping of the thickening during application of the pressure force is prevented, so that the bristles are no longer aligned to each other in an optimum way. However, the active cooling does not mean, that the thickened fastening end is cooled in the apparatus by the ambient temperature existing there. Rather, a cooling device is provided, for example an active air flow, which is generated by a fan. Said air flow may either transport ambient air to the heated parts, for example from a location more remote thereto, or also provide cooled air coming from an air condition system. A further possibility is to provide a cold chamber, through which the fastening end including the bristle(s) is passed through.

As mentioned above, the tool part has for example a planar front face facing the bristle carrier (at least in the contact area with the bristle carrier) and/or a geometry, which is not adapted to protrude into the anchoring opening, that is, which has no pin-like protrusions etc., as has been proposed in the state of the art.

As has been found, the position of the so-called parting plane between the holder and the tool part, in which both abut on each other, relative to the bristle carrier is of importance. Thus, it is advantageous to form the cavity configured to receive the bristle carrier not only in the holder, but also partly in the tool part. In relation to the thickness of the bristle carrier however, the major part of the cavity is formed by a recess in the holder. The parting plane should preferably be close or directly adjacent to a rounded transition between the side surface and the front surface of the bristle carrier, that is, outside of the rounded transition. Thus, this rounded transition is in never provided with any step or ridge, which is created by means of the squeezed out material of the bristle carrier.

By applying pressure and heat or only pressure, the total thickness of the bristle carrier is permanently reduced, that is, not only in portions, but in total. The front face of the tool part opposite of the bristle carrier is in particular heated to a temperature, which is at maximum 140° C., in particular at maximum 130° C. For example, as materials for the bristle carrier polypropylene, PET, ABS or SAN are used.

When using PET as bristle carrier material, it has been found that the front side of the bristle carrier is to be heated during reshaping to 75-95° C., in particular 80-90° C., and when using PP (for example having a melt flow index (MFI)) of 6-35, preferably 10-15, to 105-125° C., in particular 110-120° C.

As briefly mentioned above, a resilient cleaning element, made of an elastomer, in particular TPE, which protrudes at the front side thereof, may be injection moulded and fixed to the bristle carrier prior or after fastening the at least one bristle, wherein the cleaning element is arranged on the rim of the bristle carrier and/or inwards of the rim between bristles or bristle tufts. Accordingly, mixtures of cleaning elements in the same brush are conceivable. Injection moulded cleaning elements, bristle tufts, which are fastened by reshaping the rim of the anchoring opening to the bristle carrier, and single bristles adapted as elastomer, pre-manufactured cleaning elements, which may also be fastened to the bristle carrier by reshaping the rim of the anchoring opening, may be attached onto the bristle carrier in any combinations. In addition, the bristle body may be configured as multi-component injection moulded part.

The bristles may be also pre-sharpened, that is chemically or mechanically pre-sharpened bristles, or may be pre-rounded.

A plurality of bristle tufts may be anchored in the same bristle carrier, wherein at least one bristle tuft consists of bristles made of another material having a different melting temperature than the bristles of at least one other bristle tuft. The bristle tufts, which are made of different bristle materials, are heated differently in order to fuse the bristles of a tuft together to form a thickened fastening end, respectively. This may be realized in different ways: The distance between the end of the bristle tuft facing the heating device and the heating device is set differently depending on the bristle material, and/or the heating device is heated to different temperatures depending on the bristle material, and/or different heating devices, which are heated to different temperature, are used according to the associated bristle material.

For example, the bristle tufts are pushed out of the magazine in different heights. Those bristle tufts, which are made of an easier melting material, for example remain closer to the magazine than the other bristle tufts, so that the bristle tufts, which are protruded further, will get closer the heating device than the others and are thus heated more strongly. Alternatively, the bristle tufts may also be processed one after another, by pushing the bristle tufts including different bristle materials one after another with the fastening end thereof out of the magazine, in order to get closer to the heating device. The heating device is then either heated to two different appropriate different temperatures or heating devices, which are heated to different temperatures, may be used for the respective associated bristle tufts.

For a brush including bristles made of nylon and PBT, for example, first the bristles made of nylon are heated, and then those made of PBT.

The advantageous variants mentioned above may also be explicitly combined with each other in any way.

The objective according to the invention is also solved by an apparatus for producing one brush comprising at least one bristle or at least one bristle tuft, preferably a plurality of bristle tufts, which includes a bristle carrier having at least one anchoring opening for the at least one bristle or the at least one bristle tuft, in particular to carry out the method according to the invention, wherein the apparatus comprises a holder for the bristle carrier and the tool part (for example, configured as a press punch) having at least one receiving opening for the at least one bristle or the at least one bristle tuft, wherein the receiving opening ends on the front face of the tool part facing the bristle carrier, and wherein the tool part includes a heating, which heats at least portions of the front face, which is adapted and controlled in a way that the front face is heated to a temperature of maximum 140° C., in particular of maximum 130° C. In particular, polypropylene, PET, ABS, or SAN are used as material for the bristle carrier.

In the apparatus according to the invention, a tool part, which acts as temporary support for the bristle or the bristle tuft(s), is used as press punch and also the same time as transport means. A heating is embodied on the front face of the tool part in a way and is controlled by a controller in a way that the front face is heated to a temperature of maximum 140° C., in particular to maximum 130° C., when it is moved against the bristle carrier. An apparatus, which may theoretically use higher temperatures, but the controller or adjustment thereof limits the temperature in a respective predefined way, is also part of the apparatus according to the definition.

As described already above regarding the method, the feed motion of the tool part may be realized relative to the holder of the bristle carrier by movement of the holder and/or of the tool part, wherein the feed motion is controlled by pressure and time and/or by pressure and path or only controlled by time or only controlled by path.

The apparatus according to the invention may generate a pressure of at least 200 bar, in particular at least 400 bar, on the bristle carrier, that means towards the holder.

The heatability of the tool part is to be realized in the complete contact area with the bristle carrier or may even be realized in the complete area of the front face of the tool part, which is opposite to the holder and thus opposite to the bristle carrier inserted in the holder.

Furthermore, as already described regarding the method according to the invention, the tool part is for example a magazine, which is loaded in a loading station of the apparatus with the at least one bristle or the at least one bristle tuft. The at least one bristle or the at least one bristle tuft (in general, "at least one bristle" also refers to one or more bristle tufts for the complete specification and the claims) protrudes from the magazine with the fastening end thereof after loading. In the melting station, which is arranged downstream of the loading station, the fastening end(s) is/are heated, whereby a thickening is formed respectively. When using one or more bristle tufts, the bristle of the respective bristle tuft will be fused by thermal reshaping. In particular, a kind of mushroom-like, cup-like or sphere-like thickening is formed.

Generally, in the apparatus according to the invention either the magazine may be moved and stations may be stationary, or the magazine remains stationary and stuffing tools or heating devices or holders are moved to the magazine. Said tools or holders may for example be arranged on a rotating carousel, which moves to the stationary magazines one after the other. The apparatus according to the invention has a controller, which controls the feed motion of the tool part relative to the bristle carrier and also the heating operation of the tool part in a way, that the tool part is heated before it is contacted by the bristle carrier. This means, the tool part is already heated before the feed motion of the tool part towards the holder. In this phase the maximum operating temperature may exist, but it is not mandatory. The bristle carrier is not heated until the at least one bristle is inserted by the tool part, which is realized by the excess length of the thickened end relative to the magazine and to the distance of the front face of the magazine to the respective contact face on the bristle carrier.

The apparatus according to the invention is in particular configured in a way, that the tool part is permanently heated to the desired temperature, which is required for heating the front side of the bristle carrier for the reshaping operation. That means, the tool part is also already heated and has the desired temperature, when the at least one bristle or the bristle tuft(s) are inserted in the receiving opening(s). When the tool part accommodates the at least one bristle/bristle tuft also during melting of the bristle in order to form the thickened fastening end, it has to be ensured that the temperature of the tool part and/or the dwell time of the at least one bristle/bristle tuft in the receiving opening does not cause a reshaping of the bristle or bristles of a bristle tuft.

The controller may heat the tool part to such a temperature and control the feed movement of the tool part to the bristle carrier in a way that the tool part heats the bristle carrier in the area of the contact surface with the tool part during the feed motion of the tool part to the bristle carrier and/or during contacting the bristle carrier to a temperature below the melting temperature of the bristle carrier material, and preferably higher than or equal to the glass transition temperature of the material of the bristle carrier, in particular wherein the controller is configured to be programmed in a way that for a bristle carrier material having a glass transition temperature higher or equal to 300° K, the temperature of the tool part is set at maximum 15% above the glass transition temperature calculated in ° K, and for a bristle carrier material having a glass transition temperature below 300° K is set at maximum 50% above the glass transition temperature in ° K.

In the method according to the invention or the apparatus according to the invention bristle bodies or bristle carriers may of course be fed, which are produced in the standard one-component or multi-component injection moulding method. Thus handles, or in a more general sense, bristle bodies or bristle carriers may be used, which are used in toothbrushes, which are actually traditionally stuffed using the (metal) anchoring technique. However, in general these handles/bristle bodies/bristle carrier have deeper anchoring openings than is required for the method according to the invention.

Also for years, multi-component handles or bristle bodies or bristle carriers are provided in the anchoring technique, wherein elastomer structures are injection moulded in the head region of the bristle body between the anchoring openings and/or the rim of the bristle head. On the back side of the bristle head elastomer tongue cleaners may be attached and injection moulded, for example. Any of these possibilities apply also to the method according to the invention and the apparatus according to the invention.

In the anchoring technique, these elastomer structures are attached on the front side or back side before stuffing is carried out. An attachment of the elastomer structure after stuffing the bristles is performed only as an exception, it is not the usual case. In most cases, said elastomer structures are injected to a more rigid carrier structure in a multi-complement injection moulding tool. Such multi-component tools for toothbrush bodies are very widely used.

The handles, bristle bodies/bristle carriers, which are fed by the method according to the invention and/or the apparatus according to the invention, may be injection moulded using any bristle body injection moulding technique and injection moulding tools known today in a trouble-free way. The anchoring openings are thus pre-injected by using mould pins, which may be round or have any desired cross-sectional shape, and which protrude into the injection cavity. Said pins may be pushed out of the cavities after an adequate cooling and/or hardening of the injected resin, for example by using sliders, before a complete demoulding of the injection moulded part is performed. The so-called mould pins may thus be arranged parallel and/or in angled way to each other, to thus generate parallel and/or angled anchoring openings in the injection moulded part. In the method according to the invention and the apparatus according to the invention, pins may immerse less far in the injection cavities during injection moulding of such kind of parts than during injection moulding of bristle bodies or bristle carriers, which have to be stuffed by using the anchoring technique. Thus, the injection lengths of the anchoring openings have a smaller depth. As these openings are less deep, the total thickness of the heads of the brushes, which are produced by the method according to the invention and by the apparatus according to the invention, is significantly reduced as compared to the bristle heads, which are stuffed by using the anchoring technique. This results in a clinical advantage for the production of toothbrushes.

The method according to the invention and the apparatus according to the invention have distinct advantages when using clear materials for the bristle carrier or the bristle body. Such materials are usually PET, copolyester, SAN, ABS etc. Similar to the bristle carriers/bristle bodies/handles made of polypropylene, said materials may also have pre-injection moulded anchoring openings and/or may be provided with elastomers (for example TPE, TPU) in a multi-component method. After the bristle carriers/bristle bodies/handles are injection moulded using the multi-component method, they may be further processed according to the invention, as it is described above and in the following regarding the apparatus.

Upstream of the station including the holder and the tool part acting for example as press punch, an injection moulding station for generating the bristle carrier may be provided, wherein an injection mould half is provided having at least one protrusion protruding into an injection cavity, which is fastened to the injection moulding half in a fixed way or is an integral part thereof. Thus, the active sliders used up to now for injection mould halves are partly or even completely redundant. Each protrusion generates here an anchoring opening formed as a blind hole. Sliders are not only expensive to produce, but also expensive regarding maintenance and repair. As for the apparatus according to the invention the bristle or bristle tuft is not fixed using an anchor in the bristle carrier, which requires a minimum depth for the anchoring opening, anchoring openings that have a reduced depth for fixing the bristle or bristle tuft are sufficient.

However, the present invention also generates an apparatus for producing a brush, in particular for performing a method according to the invention, wherein a tool part, which includes at least one receiving recess for the at least one bristle or at least one bristle tuft, and an opposite holder are provided. The tool part and the holder are movable towards each other and away from each other (in the feed direction and opposite to the feed direction). The tool part is heatable, for example by an electrical resistance heating, which is integrated, and the holder is provided with an active cooling device, in particular connected to a cooling water circuit. Thus, in components, which contact each other and define at least one common cavity for receiving a bristle carrier, heating and cooling is performed at the same time.

The apparatus has at least one electric motor, preferably a servo motor for applying the pressure force on the bristle carrier. Electric motors have the advantage, that the pressure force may be set very easily, and that they may be adjusted in a reliable and easy way.

Multiple electric motors for applying the pressure force may be provided. In addition, an electric motor may also exposure a plurality of bristle carriers to pressure at the same time, by delimiting a plurality of cavities between a tool part and a holder. In order to increase the output rate of the apparatus, in particular a plurality of electric motors is provided, which expose a plurality of bristle carriers, respectively, to pressure.

In addition, turntables or equivalents may be advantageously used for increasing the production rate. For example, a plurality of units may be provided, depending on which stations require a longer cycle time.

The apparatus according to the invention is to include a controller, which is programmed in a way, that during operation the tool part is permanently heated to the temperature, which is desired during application of the pressure on the bristle carrier. Thus, no desired temperature variations exist during operation, so that there is no heating-up time for the tool part, which would negatively impact the cycle rate.

Finally, the invention also relates to a holder for an apparatus according to the invention. According to the invention, this holder is provided with at least one cooling channel. Terminals on the outside of the holder enable a connection to a cooling circuit, in particular a liquid cooling circuit.

The holder is in particular a plate having one or more cavities for receiving the bristle carrier(s).

Furthermore, the holder has preferably depressions for a plurality of bristle carriers to form partial cavities. Due to the fact, that the holder including the depressions is exactly matched to the design of the brush (surface area support), a new holder has to be manufactured for every new design. Thus, the holders are very expensive. In addition, the cooling channels increase the costs.

In order to reduce costs, it may be advantageously for the holder to have only one cooling channel on the back side thereof, which has the form of a groove, which is simply produced by milling. The cooling channel is then completed by providing a flange plate, which for example is permanently installed and which on the front side thereof is also provided with a groove. When the holder is then screwed to the flange plate, both grooves complement each other to form the closed cooling channel or the closed cooling channels. Alternatively, the cooling channel(s) may also be generated by one or more drillings through a plate-like holder. In order to connect, for example parallel holes on the side of the rim with each other, plates may be provided, similar to the radiator of a car. These connect adjacent ends of the cooling channels in a fluid way.

For each bristle carrier, the holder has a recess, which is formed complementary to the bristle carrier, from which the bristle carrier preferably protrudes a little bit.

In addition, it has to be expressively noted, that the advantages and features mentioned above regarding the method according to the invention also apply to the apparatus according to the invention, and both individually or in combination, corresponding to the method according to the invention.

Further, it has to be noted, that the method according to the invention and the apparatus according to the invention may be used for any brushes and are not limited to toothbrushes. The method and apparatus may for example also be used for brushes used in the household, scrubbers, brooms used in the household or any kind of brooms, diswashing brushes, toilet brushes, hairbrushes, vacuum cleaner brushes, handwashing brushes, and paint brushes of any kind, for example nail lacquer brushes, face brushes (like toothbrushes, manual or electric brushes). Thus, the details and variants described in the following figures may also be used for any of these brushes.

Further features and advantages of the invention will become obvious from the following specification and the following figures, to which reference is made.

Figure 2:
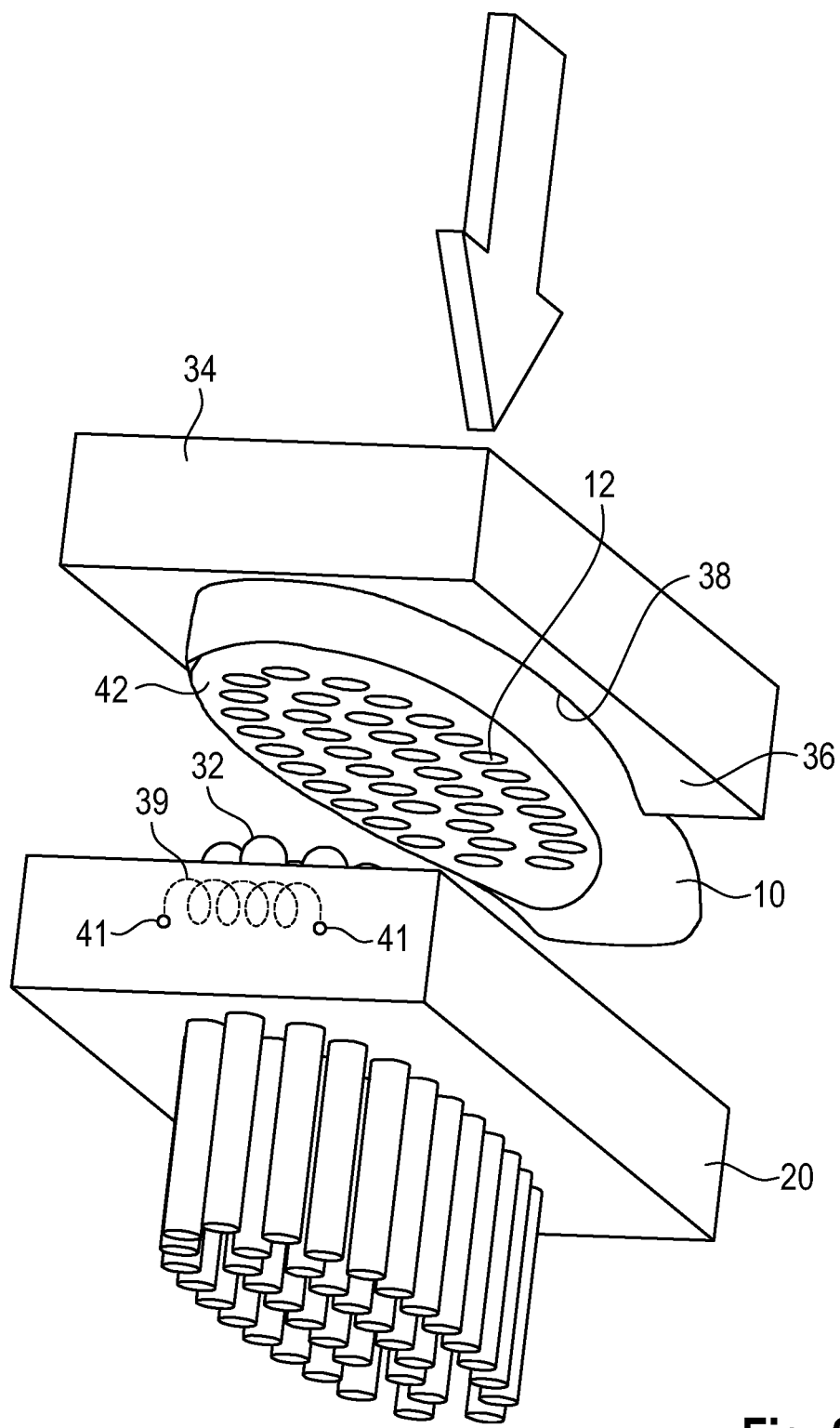

In the figures show:

FIGS. 1a to 1g different subsequent steps of the method according to the invention in the perspective top view and a perspective bottom view, which also shows the apparatus according to the invention, FIG. 2 an enlarged view of the perspective bottom view of the anchoring station in FIG. 1e, FIG. 3 a section view through the anchoring station displayed in FIGS. 1e and 1f before the magazine and the carrier are moved towards each other.

Figure 6:
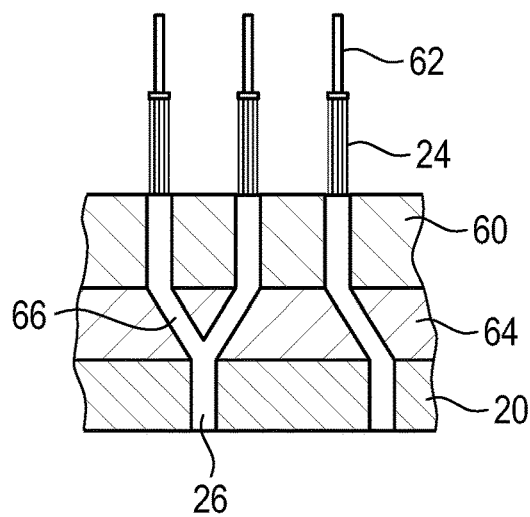
Figure 7:
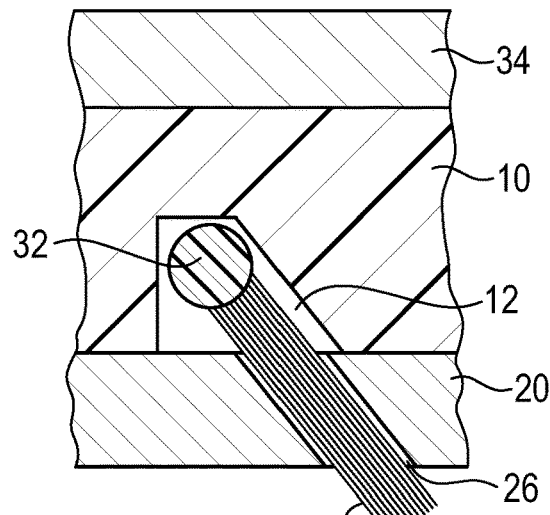
Figure 8:
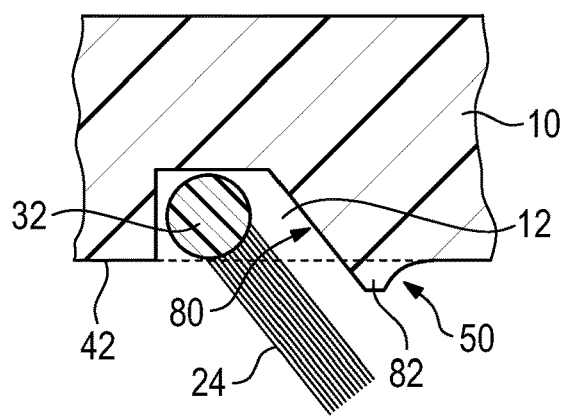
Figure 9:
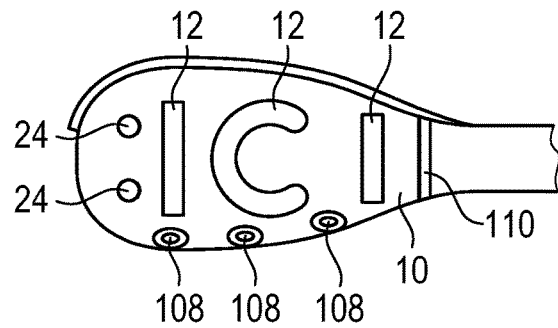
Figure 10:
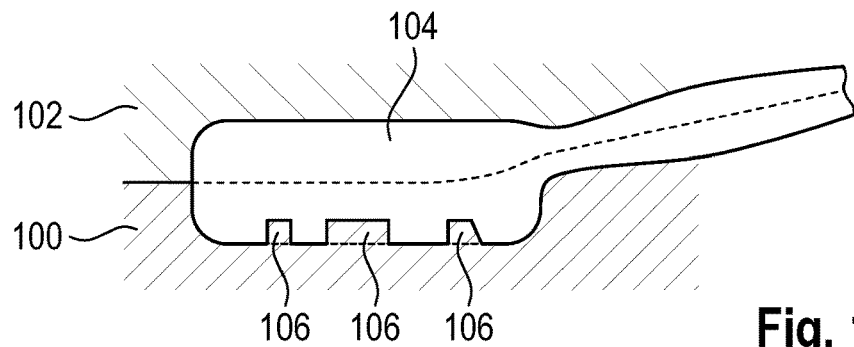
Figure 11:
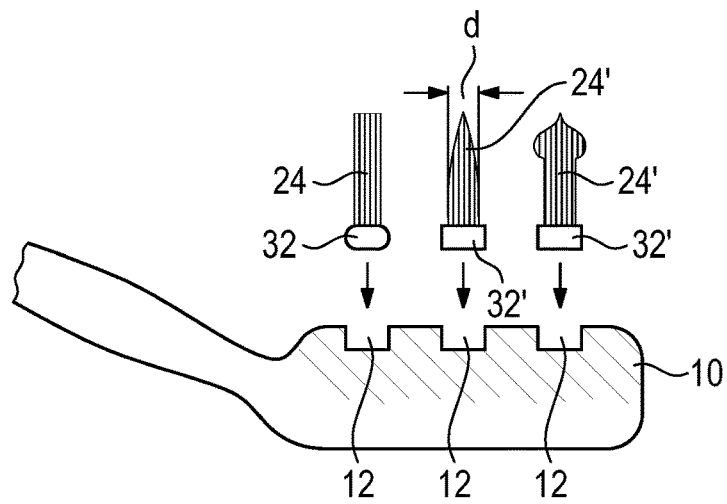
Figure 12:
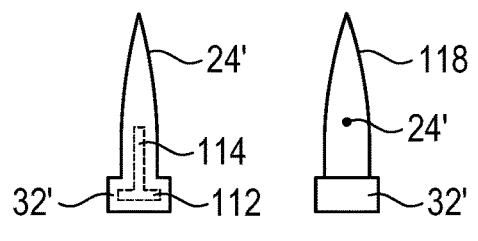
Figure 13:
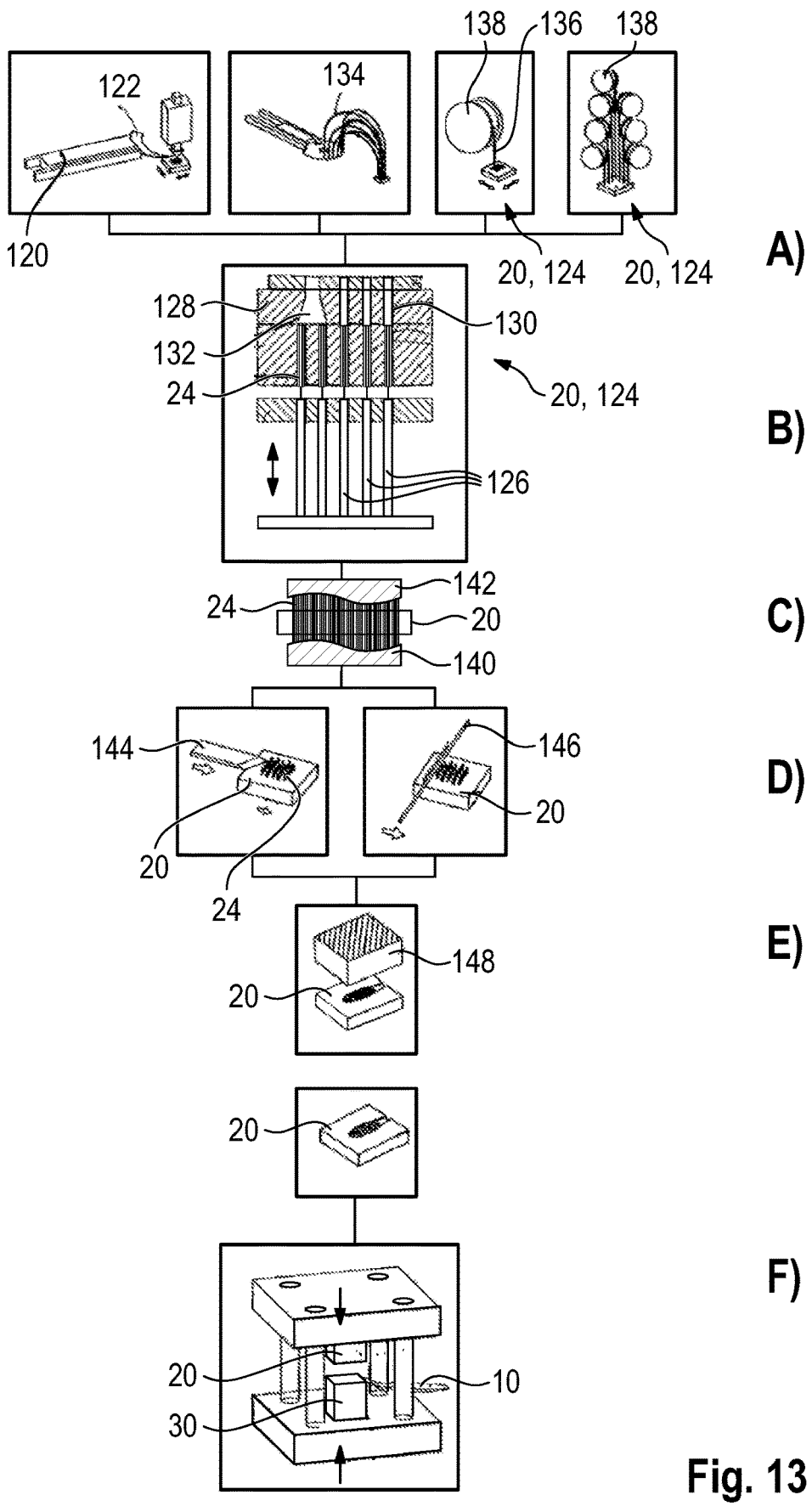
Figure 14:
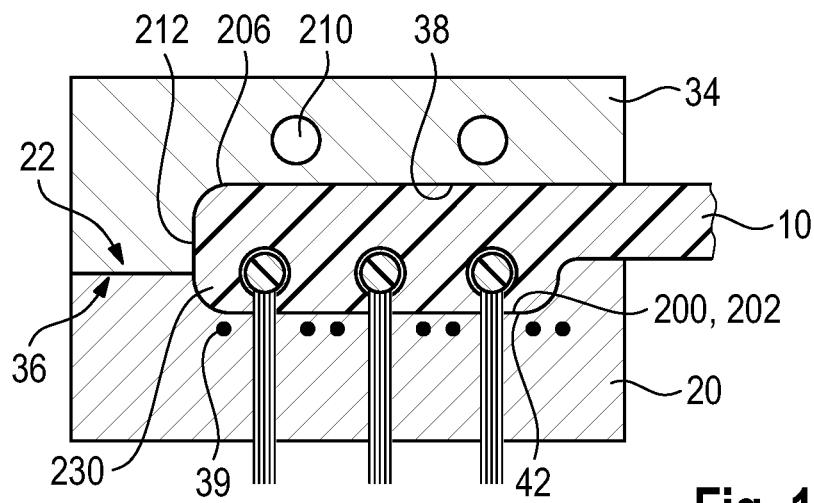
Figure 15:
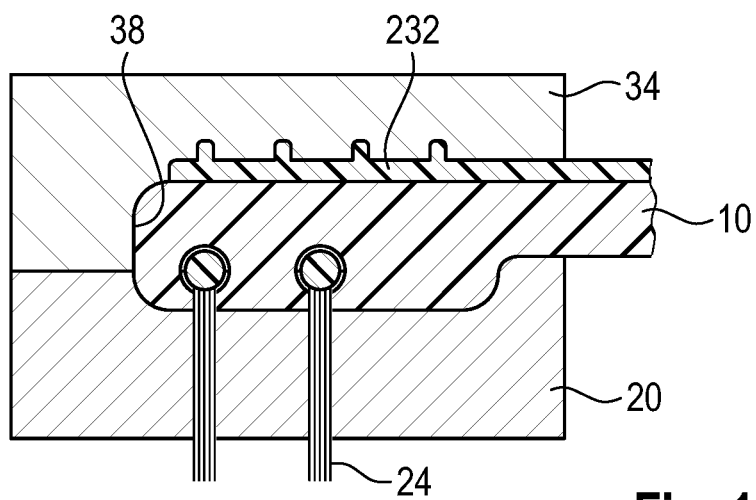

FIG. 4 a respective view of the station according to FIG. 3 during the first contact of the magazine and the bristle carrier, FIG. 5 and FIG. 5A respective views of the anchoring station according to FIG. 3 after the feed motion has been completed and after the application time has been ended, directly before moving the station apart and opening it, FIG. 6 a section view through an alternative loading station, FIG. 7 a section view through the anchoring station according to FIG. 3, where bristle tufts are processed, which are oriented in an inclined way, FIG. 8 a section view through an alternative bristle carrier used in the invention, FIG. 9 a front view of a bristle carrier produced by the present invention, FIG. 10 a section view through an injection mould, which is used to injection mould the bristle carrier according to FIG. 9, FIG. 11 a section view through a bristle carrier during insertion of the bristle tufts and/or of single elastomer bristles, FIG. 12 variants of single, pre-manufactured bristles used in the invention, FIG. 13 variants of the method according to the invention and the apparatus according to the invention, FIG. 14 an enlarged section view of a variant of the apparatus according to the invention, here the anchoring station with the holder according to the invention, and FIG. 15 an enlarged section view of a further variant of the apparatus according to the invention, here the anchoring station with the holder according to the invention for a bristle carrier provided with an elastomer.

In FIG. 1 an apparatus for producing brushes, for example toothbrushes, is shown. As is well known, such a toothbrush comprises a bristle head including bristle tufts, which are protruding on the front side, a neck and a handle. These three portions may be integrally formed and merged with each other, they form the so-called bristle body. The bristle head may either be stuffed directly or it may be embodied as two parts having a plate-like bristle carrier, which has already pre-manufactured anchoring openings formed as blind holes, wherein said plate-like bristle carrier is then combined with the rest of the head, either by welding, gluing or by overmoulding. An alternative hereto is that the bristle head is configured as one part, thus it forms the bristle carrier by itself.

Such an embodiment is illustrated in FIG. 1, the bristle head forms also the bristle carrier 10. In this illustration, the bristle carrier 10 is also the bristle body, as it comprises handle, neck and head of the brush. The bristle carrier 10 is a pre-manufactured injection moulded part. FIG. 2 shows that the bristle carrier 10 has a multitude of pre-manufactured openings 12 on the lower side thereof, which have been created during injection moulding, into which the bristle tufts are inserted and anchored. However, the following specification applies also to plate-like bristle carriers 10 and may be read accordingly.

The apparatus shown in FIG. 1 comprises a plurality of stations, that is a loading station 14, which is shown in FIGS. 1a and 1b, a melting station 16, which is shown in FIG. 1c, and an anchoring station 18 for the bristle tufts, which is shown in FIGS. 1e and 1f.

All stations will be passed by a magazine 20, which is also called the tool part, which transports bristle tufts through the single stations.

Although in FIG. 1 a magazine 20 having receiving openings for a brush is shown, which will be later displayed in more detail, in real operation the magazines 20 are preferably dimensioned in a way, that a plurality of adjacent groups of receiving openings is formed for a plurality of brushes in the magazine 20. Also a plurality of rows of groups of receiving openings for a plurality of brushes may be provided.

The magazine 20 is for example a plate-like part having a constant thickness, which has an upper planar front face 22, according to FIG. 1. As an alternative hereto, the magazine, which has basically the shape of a plate, has a recess 200 on its planar front face 22 having a bottom 202, which may also be planar, as shown in FIG. 14, to form a part of a cavity for receiving the bristle carrier 10.

As the magazine passes a plurality of stations and is subsequently used for the production of additional brushes, a magazine circulation operation is provided in the apparatus, wherein a multitude of identical magazines 20 pass one after another through the single stations at regular intervals. The magazine 20 is thus a transport means for bristle tufts 24 through the apparatus. As an alternative hereto, the magazine may be stationary, and the single stations are passed at regular intervals around the magazine, as for example on a carousel. The plurality of stationary magazines may be processed at the same time, more precisely, the bristle tufts, which are arranged in the magazines.

The magazine 20 has a plurality of receiving openings 26, which have a hole design, wherein the hole design corresponds to the hole design of the bristle carrier 10.

Each bristle tuft 24 comprises several bristles, which are inserted from a bristle reservoir one by one into the magazine 20, as shown in FIG. 1 a, for example by using pins, as will be explained in the following. The single bristle tufts 24 may be supplied via pipes filled with pressurized air or vacuum.

The bristles are made of a thermoplastic material, in particular PA, PBT, polyester, copolyester or polypropylene, however they may also be made of elastomers. Further it is also possible to insert coextruded bristles, for example including a core of PA having an elastomer coating. As will be explained later referring to FIGS. 11 and 12, it is also not mandatory to insert and embed only bristle tufts 24 in the anchoring opening, but also only one single pre-manufactured bristle adapted for example as elastomer cleaning element may be inserted and fixed in the anchoring opening thereof according to the method described above and in the following. Such cleaning elements are injection moulded or foamed in a separate process and are softer than the bristle carrier 10.

The bristle tufts 24 include opposite ends and protrude with the back side end 28 thereof, the so-called fastening ends, a little bit out of the magazine 20, that is they protrude a little bit from of the front face 22. This is shown in FIG. 1b.

The magazine 20, which is completely loaded with the bristle tufts 24, is laterally transported in the melting station 16, as shown in FIG. 1c. In said station a heating device 30 exists, which for example may be a plate heating or a hot-air heating. The back side ends 28 of the bristle tufts 24 are heated in a contactless way, so that the single bristles exceed the melting temperatures thereof and the bristles of a tuft are fused with each other into a thickened fastened end. The bristle of a bristle tuft 24 are thus connected with each other integrally as one piece. The thickening 32 of a bristle tuft 24 does not merge into adjacent thickenings of the adjacent bristle tufts 24, but remain sphere-shaped or lens-shaped thickenings. In addition, preferably no punch is pressed against the thickenings or the still liquid material of the fused bristle ends.

In the same bristle carrier 10 a plurality of bristle tufts 24 may be anchored, wherein at least one bristle tufts 24 consists of bristles made of another material having a different melting temperature than the bristles of the at least one other bristle tuft 24. The bristle tufts 24, which consist of different bristle materials, will be heated in different degrees, to fuse the bristles of a tuft in order to form a thickened fastening end. This may be realized in different ways: The distance between the end of the bristle tuft 24 facing the heating device 30 and the heating device 30 will be set differently depending on the bristle material, and/or the heating device 30 is heated to different temperatures depending on the bristle material, and/or different heating devices 30, which are heated to different temperature, matched to the associated bristle material are used.

For example, the bristle tufts are pushed out of the magazine 20 in different heights depending on the bristle material. Those bristle tufts 24, which are made of a material which melts easier, stay for example closer to the magazine 20 as the other bristle tufts, thus the bristle tufts 24, which are protruding further, will get closer to the heating device and are thus heated more strongly.

Alternatively, the bristle tufts 24 may also be processed one after another, by pushing the bristle tufts 24, which include different bristle materials, one after another with the fastening end thereof out of the magazine in order to get closer to the heating device 30. Either the heating device 30 is then heated to two appropriate different temperatures or heating devices 30, which are heated to different temperatures, may be used for the respectively associated bristle tufts.

Pushing out of a single bristle tuft or groups of bristle tufts is performed for example by using a divided baseplate 44 (see FIG. 5), the parts of which are movable independently of one another in the direction of the length of the bristles.

For a brush including bristles made of nylon and PBT, for example, first the bristles made of nylon are heated and then those made of PBT.

Optionally, the thickenings 32 may already be actively cooled in the melting station 16, or on their way to the subsequent anchoring station 18, or in the anchoring station 18 itself. This is for example carried out by means of a flow of cold air 214 supplied by fan (see FIG. 1d) or by designing the station 1d as a cold chamber, through which the magazine 20 is passed, which includes the still softened thickenings 32 on the back side. The cycle time may be increased due to the cooling of the thickenings 32.

The magazine 20 forwards the bristle tufts 24 into the subsequent anchoring station 18. Said anchoring station ensures that the bristle tufts 24 are fixed in the anchoring openings 12 of the bristle carrier 10 exclusively without using an anchor.

The anchoring station 18 comprises at least a holder 34 (preferably a plurality of holders 34), which on the front face 36 opposite to the front face 22 (see FIG. 2) has a recess 38 (a plurality of recesses, in case a plurality of bristle carriers 10 have to be received), which is formed in a complementary way to the corresponding shape of the bristle carrier 10, so that it abuts on the holder 34 with the back side thereof along the surface area (see also FIG. 14).

The holder 34 has a planar front face 36 from which the bristle carrier 10 is however protruding a little bit, as shown in FIG. 2, in order to protrude into the depression 200 in magazine 20 which is formed in a complementary way to the region of the front side of the bristle carrier 10, as is shown in FIG. 14, for example.

The magazine 20 is heatable, for example by a plate heating provided from outside, which is laterally moved in the anchoring station 18 to the magazine 20 and is able to heat it very fast, as the magazine 20 is made of metal.

As an alternative hereto, the magazine 20 is configured with a heating, in particular an electric resistance heating 39, which is shown in FIG. 2 and in FIG. 14. The windings of the heatings are denoted as symbols, they are arranged close to the front face 22 or to a depression 200 next to the bottom 202 of the depression 200, which forms a part of the front face 22.

Electric terminal contacts 41, for example wiper contacts on a side surface of the magazine 20 enable to couple the magazine 20 electrically during movement of the magazine 20 in the anchoring station 18 in order activate the heating 39. Of course, it is also conceivable that the front face 22 including the bottom 202 of the depression 200 forms an electric resistance heating layer by itself, so that the front face is heated here directly.

In case the magazine 20 is stationary, the electric connection to the heating may be realized in a very simple way, it may be configured as a permanent connection.

The heating 39 ensures that preferably the complete front face 22, which contacts the bristle carrier 10, is heated, that is also the portions between the thickenings 32.

The temperature, to which the front face 22 (in the area of the contact with the bristle carrier 10) is heated, is below the melting temperature of the bristle material and/or the bristle carrier material, preferably of both materials. In particular, it is maximum 85% calculated in ° C. of the respective melting temperature of these materials. For example, if both materials have a melting temperature of 100° C., the temperature of the finally heated magazine 20 on the front face 22 is thus at maximum 85° C.

FIG. 3 shows a section view through the anchoring station 18 of FIG. 1e, before the magazine 20 and the bristle carrier 10 are moved towards each other.

The dimension of the thickening 32, as seen in the longitudinal direction A (also denoted as axial direction or feed direction), is smaller than the respective cross-section of the anchoring opening 12, thus it may be inserted in the anchoring opening 12 without abutting on the inner rim 40 of the anchoring opening 12 or contacting the rim 40. In particular, at this point of time, the cylindrical anchoring opening 12 has only an excess dimension of at maximum 0.2 mm, in particular at maximum 0.15 mm compared to the largest cross-section of the thickening 32 (fastening end).

The magazine 20, which is permanently heated to the desired temperature, that is during the complete operation, and/or the holder 34 are moved relative to each other towards one another, in the present case only the holder 34 with the bristle carrier 10 is moved, so that the thickening 32 arrives first at the anchoring opening 12, before the front face 22 contacts the facing planar front face and front side 42 of the bristle carrier 10. During the feed motion, the bristle carrier 10 is nearly not heated at all, as long as the bristle carrier 10 is not contacted by the magazine 20, as the feed motion is carried out very fast and there is no dwell time in the opened position of the anchoring station 18 shown in FIG. 3.

A base plate 44 (see FIG. 3), where all bristle tufts 24 rest with the front side, front face free ends thereof and which forms a support, may be adapted to align the bristle tufts 24 on the front end thereof to each other and at the same time generate a gap between the thickening 32 and the front face 22, if desired. The base plate 44 is adapted as support for the single bristles and for the bristle tufts 24.

As shown in FIG. 4, the front face 22 contacts the front side 42 of the bristle carrier 10, and thus heats the bristle carrier 10 on the complete contact area between both parts.

The bristle carrier 10 is made of thermoplastic material, in particular of resins mentioned above, as polyproplyene, ABS, PA, PBT, PET, or PC.

However, the movement of the holder 34 is not remaining in the position of the first contact, which is shown in FIG. 4, as a very high pressure is applied on the bristle carrier 10 by the holder 34 and the magazine 20.

For example, during the movement towards each other a pressure of at least 200 bar, preferably at least 400 bar, is applied on the bristle carrier 10. This pressure is already applied at the first contact by the bristle carrier 10 and the magazine 20, and it remains the same over application time (contact time).

This pressure is maintained while the bristle carrier 10 is concurrently heated over an application time of at least 4 seconds, in particular at least 5 seconds, and at maximum 15 seconds, in particular at maximum 10 seconds.

The application time is composed of a dwell time and a period of time (so-called compression time) during the feed motion, which starts, when the front side 42 is contacted by the magazine 20 and the back side of the bristle carrier 10 is contacted by the holder 34 at the same time. The compression time ends, when the position is reached, where holder and tool part are moved towards each other to a maximum degree, and the distance of the holder and tool part is kept constant for the dwell time. The dwell time is the period of time, in which the feed motion is completed, that is the apparatus is closed completely, and the bristle carrier 10 is received in the closed cavity. Said dwell time is preferably at least 1 second, preferably at least 1.5 seconds and/or at maximum 3 seconds, in particular at maximum 2.5 seconds.

During compression time, the distance of the holder to the tool part is reduced in an extremely slow and constant speed. For example, a total compression path of 0.3 mm is passed in 3 seconds as the fastest.

During application time, the magazine 20 is preferably continued be heated, wherein due to the large mass of the magazine 20 it may also be possible to stop a further heating after the first heating to the operation temperature. Nevertheless, during application time the bristle carrier 10 is continued to be heated.

The apparatus is in particular moved to stop, that is the holder 34 contacts the portion of the front face 22 outside of the depression 200 with a front face 36 (see FIG. 14) outside of the cavity formed by the recess 38 and the depression 200. In said contact area no gap is provided, into which material could penetrate from the cavity, rather the cavity is sealed by an annular circumferential contact area.

Furthermore, preferably in general, not only limited to the embodiment shown, no heating is provided in the contact area between the holder 34 and the magazine 20, so that the heating is only present and effective in the area of the contact between the front side 42 and the magazine 20.

The parting plane between holder 34 and the tool part (here magazine 20), which is defined by the front face 36, is preferably located closer to the front side 42 than to the back side of the bristle carrier 10. More precisely, the parting plane is almost or directly adjacent to a rounded transition between the side surface 212, which connects the front side 42 and the back side.

It is advantageous, when the support adapted as baseplate 44 is removed at least during the last phase of application of the pressure force, that is, at the end of the application time, and does not contact the bristles any longer. This enhances the precision of alignment of the bristles both towards each other and also in relation to the bristle carrier 10. However preferably, the base plate 44 is removed already before start of the dwell time or even before application time, as it is shown in FIG. 3-5 by way of symbols as arrow Y. For example, according to FIG. 1, the base plate 44 is only inserted in the station c) and in d), if appropriate.

In order to be able to also define the axial position of the bristle tufts and the single bristle during the complete application time, the cross-section of the receiving opening 26 and the cross-section of the bristle tuft 24, which is inserted in it, are aligned in a way, that the bristle tuft 24 is clamped in the receiving opening 26 and is thus positioned in an axially fixed way. Due to its self-weight, or also by the inertia during movement within the stations and from station to station, the bristle tuft 24 is not displaced.

In the illustrated example, the complete flat front face is heated, at least on locations where a contact with the magazine 20 on the front side 42 of the bristle carrier 10 exists. In case the magazine 20 has a depression 200, it is sufficient and advantageous, when a heating is only arranged in the region of the bottom 202 of the depression 200. However, as the magazine 20 is normally made of steel, the complete magazine 20 is heated. The temperatures, which are set however, are configured to heat the front side 42 of the bristle carrier 10 to the desired temperature.

The temperature, to which the bristle carrier is heated in the region of the front side 42 during the application time, is below the melting temperature of the bristle and/or bristle carrier material, in particular at or below 85% of the respective melting temperature calculated in ° C. Thus, the temperature equals the above-mentioned maximum operating temperature of the magazine 20 in the region of the front face 22 or of the bottom 202.

As an alternative hereto, at least the rim 50 of the anchoring opening 12 may be heated in the region of the front side 42, which forms the region of the wall of the anchoring opening 12, which is adjacent to the mouth of the front side 42.

The temperature, to which the bristle carrier 10 is heated at least in the region of the rim 50, preferably in the complete contact area with the magazine, should not only be lower or significantly lower than the melting temperature of the materials, but lie in a range of the glass transition temperature of the bristle carrier material. For extremely high pressure, for example over 600 bar, it would be possible to heat the bristle carrier 10 in the region of the front side 42, at least in the region of the rim 50, only to a temperature above a threshold temperature, which is 60% in ° C., in particular 80% in ° C. of the glass transition temperature of the bristle carrier material, in case the bristle carrier material has a glass transition temperature of higher or equal 300° K. Preferably, this threshold temperature is, however, equal to or a little bit above the glass transition temperature. For a bristle carrier material having a glass transition temperature of lower 300° K, the heating temperature is at maximum 50% above the glass transition temperature calculated in ° K.

According to a further variant the heating of at least the rim 50 of the front side 42, in particular of the complete contact surface of the bristle carrier 10 in the region of the front side 42 is heated to a temperature at least 30° C. above the ambient temperature, in particular before the rim 40 inside the anchoring opening 12 is heated by the magazine 20 above ambient temperature.

As illustrated in the figures, the magazine 20 has no protrusions etc., by means of which it would protrude into the anchoring opening 12, as it has a planar front face 22 or a planar bottom 202 in the region of the front side 42.

As the front side 42 is also planar and no collar etc. is existing in the region of the mouth of the anchoring opening 12, that is in the region of the rim 50, as it is the case in the state of the art, the complete area of bristle carrier material is reshaped in the region of the front side 42 during application of pressure and temperature. The material tends to flow away and thus goes into the anchoring openings 12 in the region of the mouth and narrows them.

By applying heat and pressure, the total thickness D and thus the maximum thickness of the bristle carrier 10 in the region of the mouth of the anchoring opening 12 to the front side 42 is permanently reduced. A kind of constriction is created, which engages with the thickened fastening end in the pullout direction from behind and thus fixes the bristle tuft 24.

There is no adhesion created between the thickened fastening end and the wall of the anchoring opening 12.

It is not required to reshape the rim in an extreme way. It has been found, that for example for toothbrushes, it is sufficient to reduce the cross-section of the anchoring opening 12 having the original width or the original cross-section D3 in the region of the rim 218 (see FIG. 5A) only to a width or an inner diameter D1 such that the difference of the width or of the diameter D2 of the thickest point of the thickening 32 (with respect to the respective cross-section plane) to the width or the diameter D1 in the region of the rim 218 is only about 0.1-0.5 mm.

It is advantageous, when the thickening 32 has an undersize regarding the not yet reshaped anchoring opening 12 during insertion (that is, D2 is smaller than D3).

This is however not mandatory. For example, a minimum side offset of the thickening 32 towards the anchoring opening 12 may be exist, although the thickening 32 has an undersize and a circumferential gap should exist between the thickening on the thickest point thereof and the inner side of the anchoring opening 12. Due to the offset, the thickening may come into contact with the wall of the anchoring opening 12 on a side during insertion in the anchoring opening. In this context it may be advantageous, that the material of the thickening is not yet completely solidified inside, when the thickening 32 is inserted into the anchoring opening. In case the thickening forms a yet relative thin, cooled down film and is still very soft inside, the film including the thickening is simply deflected inwards, without damaging the thickening itself. The thickening is still suited to be circumferentially engaged by the reshaped rim from behind.

By way of this conception, to insert the thickening 32 in a not completely solidified state into the anchoring opening 12, it is in general also possible to use a thickening 32, which is formed with an oversize compared to the cross-section of the anchoring opening 12, that is, D2 is larger or equal D3.

In FIG. 5A the space formed by the anchoring opening 12 and limited to the outside by the constricted rim 218 for accommodating the thickening 32 is illustrated in an exaggerated way, just as the thickening 32 is shown in an exaggerated way in relation to the diameter D1.

However de-facto, not the complete wall, which forms the anchoring opening 12, abuts on the thickening 32 or on the bristles, which are located outside and which extend from the thickening 32. Instead, the wall is only reshaped in the region of the rim 218 and in a directly adjacent portion 220, which expands towards the outside to the bottom 208, and abuts only in these portions on the bristles or the thickening 32, and applies a pressure thereon.

However, the thickening is to contact the bottom 208 in order to define the axial position of the bristle tuft in a precise way.

In the rest of the region, for example between the bottom 208 and the thickening 32 or in the region of the periphery of the wall adjacent to the bottom 208, there are one or more air gaps 222 between the wall and the outside of the thickening 32, so that they are not compressed, clamped and/or reshaped in this region.

In the region of the rim 218 a thickening of the bristle tuft 24 as compared to the state thereof in the magazine 20 is carried out by constricting and narrowing the rim 284 by at least 3%, in particular by at least 5%. Hereby, the cross-section area of the receiving opening in the magazine is compared to the cross-section area of the rim 218 on the narrowest point thereof.

All anchoring openings 12 are closed by the apparatus shown and the respective method at the same time, and thus all bristle tufts 24 are anchored in the bristle carrier 10 at the same time.

As can be seen further in FIGS. 4 and 5A, not the complete anchoring opening is reshaped, but is only reshaped to a certain depth t, which equals to 85%, in particular 70% of the total depth T of the anchoring opening 12, and/or has an axial extension of 0.5-1.3 mm, in particular 0.6-0.9 mm.

The thickening 32 itself is preferably clamped in the anchoring opening only in the axial direction over at maximum 50% of the actual total length thereof. The rest of the clamping is carried out in the region of the bristles extending from the thickening 32.

The wall of the anchoring opening 12 is not reshaped over a depth Z (see FIG. 5A) of at least 0.8 mm, starting from the bottom 208, and/or is not clamping the thickening 32 and also the bristles in this region.

The depth T of the anchoring opening after producing the brush is at maximum 4 mm, in particular at maximum 2.7 mm.

All anchoring openings 12 are blind holes, so that the bristle carrier 10 does not have to be covered at the back side, as no parts of the bristle tufts are visible or protrude from this side.

The anchoring generated in this way, is the only anchoring for the bristle carriers, no metal anchor or metal wire is required.

In general, it has to be noted, it is not limited to the embodiment shown that the bristle carrier 10 should not be heated to a temperature close to the melting temperature thereof, but significantly lower to a temperature close to the glass transition temperature. In particular, the heating temperature and thus also the temperature on the magazine 20 in the area of the front face 22 and the bristle carrier 10 should not be higher than 15% above the glass transition temperature of the bristle carrier material and/or of the bristle material at the front face thereof.

When using PET, according to a preferred variant of the invention, the front side 42 is heated during reshaping to a temperature of 75-95° C., in particular 80-90° C., for PP to a temperature of 105-125° C., in particular 110-120° C. The PP is in particular selected in a way, that it has a melt flow index (MFI) of 6-35, preferably 10-15 in the initial state.

According to an embodiment of the invention, the front face 22 and thus the bristle carrier 10 is heated to a temperature of at maximum 140° C., in particular at maximum 130° C., preferably heated to a temperature in the range of 100 to 115° C. As materials here in particular a polypropylene, PET, ABS, copolyester and SAN are used for the bristle carrier.

The back side 206 of the bristle carrier 10 and the region extending from the back side 206 to at least the bottom 208 of the anchoring openings 12 (preferably even further towards the front side 42) should not be reshaped. In order to move the temperature limit, above which a reshaping would be carried out due to the applied pressure, as near as possible to the front side 42 of the bristle carrier 10, the holder 34 may be provided with an active cooling.

In FIGS. 3 and 14 this cooling is symbolized by cooling channels 210, through which the cooling liquid flows. The cooling channels 210 are connected to a cooling water circuit, which pumps cold water, preferably below 20° C., in particular even under 10° C., through the holder 34. During application of the pressure, the back side 206 will thus be heated to a maximum of 25° C. Also, the side surface 212 connecting the front side 42 and the back side 206 (see FIG. 14) of the bristle carrier 10 may be cooled in the holder 34 in a sufficient way, so that it is not reshaped and is kept below the respective temperature, at which a reshaping and deforming would take place.

After the predetermined application time, the holder 34 and the magazine 20 are moved apart from each other again, so that the bristle tufts 24 are pulled out of the receiving openings 26 thereof. A post-processing by way of another shaping for the bristle carrier 10 is not required.

The moving apart is preferably not carried out in one step, but a rest period is integrated in the process of moving apart. Hereto, the tool part, that is the magazine 20, and the holder 34 are moved apart from each other to a minimum degree, so that a small ventilation gap 228 (see FIG. 5A) of larger or equal 0.5 mm between the front side 42 and upper side of the tool part, that is the magazine 20, is created. When this predetermined ventilation gap 228 reaches its height, the distance is kept preferably constant for the rest period, which amounts to at least 1 second, in particular at least 1.5 seconds.

Optionally, in this rest period also cooling air may be blown to the front side of the bristle carrier 10 via the ventilation gap 228 to cool the front side.

However during said rest period the bristles remain in the receiving opening 26, as shown in FIG. 5A. In the rest period the reshaped region of the anchoring opening is stabilized, so that the bristles of the bristle tufts extend parallel to each other and are aligned evenly.

After the rest period, the apparatus is moved apart, so that the completed bristle carrier may be removed.

In order to control the respective movements and temperatures precisely, the apparatus comprises a controller 51 by means of which not only the heating temperature, but also the applied pressure and the movement flows are controlled. In addition, the heating 30 may be controlled by the same controller 51.

In case the bristle carrier material is a material like some kinds of polypropylene, for which the class transition temperature is not above ambient temperature, it is not required to heat the bristle carrier, however this is not mandatory. Also here, a minimum heating almost above the glass transition temperature may be advantageous, however also again significantly below the melting temperature. In case no heating has to be performed or is performed for such bristle carrier materials, the anchoring openings 12 are exclusively closed by applying the above-mentioned pressure during the above-mentioned application time. Here it is possible to use magazines 20 without heating or to use magazines having a heating, wherein the heating is simply not activated.

Regardless of the bristle carrier material, the following applies: During the feed motion of the magazine 20 relative to the holder 34 and thus to the bristle carrier 10 (the relative movement of the parts denotes that one or both of these parts may be moved towards the other part) a pressure and time controlled feed motion and/or a pressure and path controlled feed motion may be advantageous.

In particular it is advantageous, if in a first phase of the feed motion, the rim 50 or the complete front side 42 is heated to a temperature, which is above the threshold temperature. Said threshold temperature is 60%, in particular 80% below the glass transition temperature of the bristle carrier material, calculated in ° C., in case the bristle carrier material has a glass transition temperature of above 300° K. However, preferably the threshold temperature corresponds for a glass transition temperature at a maximum 20% above the glass transition temperature in ° C. In the following second phase of the feed motion, the rim 50 is then reshaped, and the rim 50 is pressed against the bristles.

Alternatively to this, the feed motion is carried out with the constant small speed, when the bristle carrier is contacted on the front and back side thereof, and is thus compressed in the axial direction, and the magazine 20 and the holder 34 are moved together to stop.

In addition, also for the embodiment shown in FIG. 5, the material presses against the bristles in the region of the rim 50 in a closed state, so that no gap is provided between bristle and rim 50.

The loading of the magazine 20 may be either carried out, directly via a bristle singulation device, as shown in FIG. 1a, or by means of another variant, which is shown in FIG. 6. Here, first a cartridge 60 having a plurality of receiving openings is filled with bristle tufts. By using this cartridge, the single bristle tufts may then be stored until they are directly pressed into the magazine 20 by means of movable pins 62, by example.

Alternatively, also a deflector plate 64 may be provided between the cartridge 60 and the magazine 20, which has inclined transport openings 66 for the bristle tufts 24, which are moved through it. It is also possible to combine a plurality of bristle tufts 24 to a larger bristle tufts by means of converging transport openings 66, as shown on the left side of FIG. 6, when for example the bristle is to include bristle tufts having a different thickness. Of course, the magazine may also include inclined receiving openings 26, as there are brushes, where the bristle tufts do not extend perpendicular to the front side 42, but are arranged in an inclined way hereto. However, the anchoring shown here corresponds to the figures. Alternatively, here the anchoring openings 12 for such bristle tufts 24, which are aligned in an inclined way, may be embodied in a slightly inclined way or conically or only conically in the region on the side of the bristle tuft 24 inclined thereto, as it is shown in FIG. 7.

In FIG. 8 an anchoring opening is shown, which comprises on the inside thereof a rim portion 80, which extends in an inclined way to the front side 42 opposite to the tool part thereof. Before impingement of the bristle carrier by the tool part on the front face rim 50 in the region of the inclined rim portion 80, the bristle carrier has a protrusion 82 protruding from of the front side 42 towards the tool part, and apart from that has a flat front side 42.

The bristle carrier 10 in FIGS. 9 and 10 are produced in an injection moulding station which is part of an apparatus according to the invention in an injection mould which comprises injection mould halves 100 and 102. Said injection moulding station is arranged upstream of the station for stuffing the bristle carrier 10 described above. Said injection mould halves 100 and 102 form a cavity 104 between each other, in which liquid resin is injected to produce the bristle carrier 10. While in injection moulding stations used in the state of the art, the injection mould half 100 has been provided with pin-shaped active sliders, which projected through the injection mould half 100 into the cavity 104 and have been pulled out before opening the injection mould, this variant provides a much more simpler solution. Here, one or more protrusions 106 are namely mounted in a fixed way on the injection mould half 100, which freely protrude into the cavity 104. These protrusions 106 then generate the anchoring openings 12. The depth of the anchoring openings 12 is significantly lower than for the bristle carriers produced up to now, which have been stuffed using the anchoring technology. Alternatively, the bottom of the injection mould half 100 may have a movable insert 107 (see the dashed lines in FIG. 10), where protrusions 106 are located. After injection moulding, the insert 107 is pulled downwards into a depression in the injection mould half for an easier deforming, so that the protrusions are pulled out of the injection moulded anchoring openings 12, whereby the subsequent removal of the bristle carriers 10 is facilitated.

FIG. 9 shows some variants of embodiments of the bristle carrier 10. Not only circular or oval anchoring openings 12 may be provided, but any kind of shapes may be configured. For example, elongated openings may be realized, X-shaped, C-shaped anchoring openings or anchoring openings in any shape. These large anchoring openings are loaded with bristle tufts, which are composed of several, single bristle tufts, which are combined into a large bristle tuft by fusing the ends thereof. Such large bristle tufts result in a respective wall-like bristle structure.

It has to be noted, that the apparatus according to the invention and the method according to the invention may not only be used with a plurality of bristle tufts, but also only with one bristle tuft, for example for producing a paintbrush and for fastening only one or only some single bristles in the bristle carrier.

The anchoring openings 12 may thus not in general necessarily serve to receive and fix bristle tufts, rather single bristles, which are pre-manufactured of any elastomer resins, may be received and fixed in any form exactly as described before regarding the bristle tufts. These bristles may have a plate-like shape and may be inserted for example in the elongated anchoring openings 12 and may be embedded therein by reshaping the rim of the anchoring openings 12. A pre-injection moulded cleaning element, which has a cross-section in C-shape, is for example inserted into the C-like anchoring opening 12 as single bristle, for example. Of course, also bristle tufts 24 consisting of a large plurality of bristles 24' may be inserted into the bristle carrier 10. The single bristles 24' may for example be positioned in the middle of a field of bristle tufts 24 or vice versa may enclose single or more bristle tufts 24.

It has to be noted, that the features mentioned above, which has also been explained by means of the bristle tufts, may also be used for single large bristles. Only as an example, a plate-shaped bristle extending inclined to the bristle carrier 10 is to be mentioned, which may be inserted into the inclined anchoring opening 12 of FIGS. 7 and 8, and may be anchored therein. However, the single bristle may have an anchoring end 32, from which the elongated rest protrudes in an angled way, so that it may be inserted into a cylindrical anchoring opening 12 according to FIG. 4, wherein the bristle extends outside of the anchoring opening in an inclined way.

The single separately produced bristle 24' or bristles 24' is/are preferably simultaneously fixed with the bristle tufts 24 by reshaping the respective rims of the anchoring openings 12 in the bristle carrier 10. As an alternative hereto, a plurality of separate reshaping operations may be carried out one after another for the different bristles or bristle tufts. Here also different pressures and/or temperatures may be applied by the heated tool part(s), if required, as the bristle or bristle tufts are made of different materials.

In addition, or alternatively to the variants above, elastomer cleaning elements 108 may be injection moulded on the edge of the bristle carrier 10, for example. This cleaning elements 108 are not pre-manufactured, however they also protrude on the front side from of the bristle carrier 10 and serve to massage the gingiva.

Hereto, the bristle carrier 10 may for example have holes on the edge or only recesses at the side of the edge, for example, into which the cleaning elements 108 are injection moulded. In addition, as it is more and more usual for brushes, the back side of the bristle carrier 10 may be overmoulded with a softer resin.

In the latter case it is of advantage that the cleaning elements 108 integrally merge in the back side layer made of a softer resin. As shown in FIG. 9 for the upper half, which shows a variant to the lower half, this back side layer, which is made of a softer resin, may also form a kind of frame around the harder resin of the bristle carrier 10 to act as a damper, for example.

A further variant is that the bristle carrier 10, in this case the head of the toothbrush, is coupled by using a hinge 110 made of the softer resin with the neck of the bristle body.

Generally it applies to all variants, that the bristle carrier may be a small plate as part of the later bristle body or the complete bristle body. For example, the bristle carrier may be a multi-component injection moulded part, which then already forms the completed bristle body, when the bristles are finally embedded. On the contrary it is also possible to already embed the bristles in a part of the bristle body, which then forms the bristle carrier, and to overmould said bristle carrier including the bristles afterwards.

According to that, the injection moulding station may also be embodied as a multi-component injection moulding station or a plurality of injection moulding stations may be provided, between which the station is arranged, where the bristles are anchored.

The cleaning elements 108 and/or the single, pre-manufactured bristles, which have any kind of cross section shape and which are made of an elastomer material, preferably extend forward at least to the length of the bristle tufts, but they may also protrude beyond them or maybe shorter than the bristle tufts.

As FIG. 11 shows not only, as described above, bristle tufts 24 are inserted into the anchoring opening 12 by using the thickening 32 on the fastening end and are anchored therein by reshaping the rim, but that single, pre-manufactured bristles 24' (in any shape, as seen from the side and also in the cross-section) may be embedded in the bristle carrier without using an anchor by the method mentioned above and the apparatus mentioned above. The bristles 24' are injection moulded from an elastomer material, in particular TPE.

On the portion thereof protruding from the bristle carrier 10, the bristles 24' have the largest wall thickness d (as measured in the cross-section), which is larger than 0.6 mm, in particular larger than 0.9 mm.

The pre-manufactured bristles 24' may further comprise a thickened fastening end 32', the height of which is smaller than the depths of the associated anchoring openings 12, so that the rim, which is reshaped inwardly, engages the fastening end 32' to realize a formfitting mounting. The fastening ends 32' are for example flat cylinders, the shape of which is aligned with the shape of the anchoring opening 12. However, the outer dimensions of the respective fastening end 32' are aligned with the cross-section of the anchoring opening 12 in a way, that during insertion a lateral gap exists between the fastening end 32' and the wall of the anchoring opening 12, before the reshaping is carried out.

The fastening end 32' may be made of another material, in particular a harder material than the rest of the bristle 24'. An example for this would be a fastening end 32' made of polypropylene. In addition, only a core of the bristle 24' may be made of a harder material, which is subsequently overmoulded with a softer material. Thus a disk made of a harder material may be conceivable, which forms the complete fastening end 32' or a core thereof.

Likewise, according to the left side of FIG. 12, the disc 112 forming the core may have a protrusion 114, which is integrally moulded thereon, which protrudes in the part of the bristle 24', which will be positioned outside of the bristle carrier 10.

The variant of a bristle 24' shown on the right side of FIG. 12 is configured with a fastening end 32, which is made of a hard resin, and a portion 118, which is made of a softer resin, being injection moulded thereto.

The single bristles 24 shown in FIG. 12 are tapering to a point, which shall not be interpreted as being limited thereto.

For a toothbrush, for example, often elastomer portions, which serve as tongue cleaner, as shown in FIG. 15, on the back side of the bristle carrier, which is broader than the rest of the bristle carrier 10, are injection moulded. The elastomer 232 may include knobs or ribs. In the region of the outer surface of the elastomer 232, the recess 38 in the holder 34 is configured in a complementary way to the shape of the elastomer 232 in the non-compressed state. However, the volume, which is allowed for the elastomer 232 in the compressed state (closed state of the apparatus, see FIG. 15), is smaller than in an unstressed state. That means, the assigned height of the elastomer 232 is reduced to the compression under the desired pressure. Optionally, during reshaping even the complete counter pressure may be transferred via the elastomer 232 from the holder 34 to the bristle carrier 10.

In FIG. 13 a complete apparatus including different stations is shown. It has to be noted, that the apparatus according to the invention is not required to comprise all stations, which will be described in the following.

In particular, all the variants and details, which have been described by means of the preceding figures, in particular by means of FIG. 1, may also be realized in this embodiment individually or in combination thereof, regardless of it is, for example, the cooling, the ventilation etc., and also the temperatures, temperature ranges or period of times and the materials used mentioned above.

In station A bristle or bristle tufts are singulated and a further transport is carried out. The left drawing shows a so-called fiber box 120, from which completed bristles, which may be mechanically or chemically sharpened, are pulled out in bristles by means of a bristle separation device.

These bristle tufts 24 are transported by means of a transport apparatus to a station B, in which the bristle tufts 24 are then already transferred in the final tuft geometry and in the hole design of the later brush, if appropriate.

For example, the bristle tufts 24 are inserted in the first intermediate magazine 124, having in particular the shape of a plate. By means of the intermediate magazine 124 the bristle tufts 24 may then be pushed by means of pushers 126 in a further plate 128, in which reshaping or redirection openings 130 or openings 132 for merging a plurality of bristle tufts 24 to a common larger bristle tuft or to align the bristle tufts 24 in inclined way are provided, if appropriate.

Then the bristle tufts 24 are pushed deeper into the magazine 20. Preferably, in the magazine 20 the hole geometry of the later brush is realized, but this is not mandatory, as will be explained later.

However, if appropriate, the plate 128 and/or the intermediate magazine 124 may also be eliminated, so that the bristle tufts 24 are directly transported into the magazine 20. This completely depends on the desired final position of the tuft or the tuft geometry and the hole design of the final brush.

The transport of the bristle tufts 24 after the separation may be carried out mechanically by using sliders or the pushers 126 shown in FIG. 2 into the first intermediate magazine 124 and/or the magazine 20 in station B. As a further alternative, in the second image from the left side it is shown in station A, that the separated bristle tufts are transported into the intermediate magazine 124 or the magazine 20 by means of pipes or tubes 134, in which an overpressure or underpressure is applied.

Irrespectively of the transport means used for the bristle tufts, they may be fed and/or inserted into the magazine 20 one by one after another, in groups one after another or all at the same time.

A third alternative relative to station A shows a winded strand 136 made of parallel filaments. The strand 136 is wound on a coil 138 and is continuously decoiled thereof. The end of the strand 136 is inserted in openings in an intermediate magazine 124 or the magazine 20 and then cut. After cutting the end of the strand, bristle tufts 24 having a cut length are created. For example, by means of a movable X-Y-table, on the one hand the coil or the end of the strand, which is accommodated in a movable guidance, is moved relative to the magazine 20 or the intermediate magazine 124, or on the other hand the magazine 20/intermediate magazine 124 is moved relative to the end of the strand, so that all openings in the magazine 20 or intermediate magazine 124 may be filled one after another. Furthermore, also several coils and strands may be moved relative to the magazine 20/intermediate magazine 124. Subsequently, the completely loaded magazine 20 or intermediate magazine 124 is moved out of the station and transported into station B or directly in station C. In station B the pushers 126 press the bristle tufts 24 into the magazine 20.

In order to eliminate the X-Y-table, strands also from a plurality of roles 138 may be concurrently transported into the respective openings into the magazine 20 or the intermediate magazine 124 and then be cut.

Station C is a so-called profiling station. Here the bristle tufts 24 are moved axially, so that the later ends of the tufts, which are used for brushing, are arranged in one plane or, more generally, end in any predefined surface.

In the embodiment shown, a wave shape is predefined, thus an abutment plate 140 having a complementary wave shape is spaced from magazine 20. The bristle tufts 24 are then pressed downwards by the pressure plate 142, which preferably has a complementary shape to the surface of the abutment plate 140, until all bristle ends abut on the abutting plate 140.

However, station C may also be eliminated, if appropriate, in case the desired profile may already be achieved in station B by appropriate pushers 126 having different lengths or having the same length. Both variants may be combined with each other by carrying out a so-called pre-profiling in station B by means of pushers 126 having different lengths and afterwards a fine profiling is carried out by the abutting plate 140 in station C.

Station D is a cutting station, in which the back ends of the bristle tufts are cut in order to achieve an optimum melting process of the bristle ends in the downstream station. The bristle tufts 24, which may project on the back side from the magazine 20 in different lengths, are cut mechanically quite close to the magazine 20 by using a knife 144 or thermally by using a hot wire 146. When using a mechanical knife 144, the magazine 20 may also serve as a counter knife, if appropriate. In this case, the bristle tufts 24 are pushed out of the magazine 20 on the back side thereof after cutting, so that they protrude a little bit therefrom.

Stationed D may be eliminated, if appropriate, in case the bristle ends protrude already in the same length on the back side from the magazine 20 after station B or C. This is in particular the case, when the front side tufts ends are to end in one plane.

The protruding portion of the bristle tuft 24 is then melted in station E, thus all filaments of the tuft are fused with each other, that is over the then resulting mushroom-shaped thickened tuft end. The thickness of the tuft ends is controlled by the volume of the material of filaments, which protrude on the back side from the magazine 20. Hereby, also the geometry of the tuft end may be set.

The fusing may be performed by a heated punch 148, which may contact the tuft ends or may be spaced thereto, so that the filaments fuse by radiation heat (in particular by using infrared light). Alternatively, a fusing may be achieved by means of hot air. It is of importance, that always only one single associated thickening is generated for the formed bristle tufts, as only those filaments are to be connected with each other by fusing, which will later be fixed in the same anchoring opening. A cooling of the thickening 32 may also be carried out here, when appropriate, as described above.

In the subsequent station F, the bristle tufts are inserted with the thickened fastening ends thereof ahead into the anchoring openings 12 of the bristle carrier 10 and are then pressed in, as described in detail above. This insertion may be carried out at the same time, sequentially or in groups sequentially.

A further alternative is to provide a redirection plate including respective channels, in which the bristle tufts 24 are inserted with the thickened fastening ends thereof ahead in order to be then pushed further into the anchoring openings of the bristle carrier. Said variant is an option, when the later hole design of the brush or the alignment of the bristle tufts 24 is not yet completely realized in the magazine.

The separately produced single bristles 24', mentioned above, may be fed to each station in any order, either to the magazine 20 or first to the bristle carrier 10.

The pressure force is applied for example by using an actuator, for example an electric motor 240 (see FIG. 1*f*), preferably mounted on the holder 34, and by interposing a gear like a spindle nut 242, if appropriate. This of course applies to any embodiments.

The electric motor is in particular a servo motor.

In general, by using an actuator a plurality of bristle carriers 10 may be also reshaped at the same time to retain at least one bristle or at least one bristle tuft 24 in the anchoring opening. Hereto, the holder 34 has a plurality of recesses 38 formed in a complementary way to the bristle carrier.

In order to increase the output of completed brushes, in particular a plurality of actuators are provided in parallel, which again drive a plurality of holders 34, which again accommodate a plurality of bristle carriers 10.

The controller 51 is configured in a corresponding programming, so that the method mentioned above is carried out in the apparatus.

With the apparatus according to the invention and the method according to the invention, bristle tufts may be anchored in the bristle carrier, which are extremely long and thin. The invention realizes bristle carriers having bristle tufts of a length over 8 mm and a width of less than 2 mm, in particular less than 1 mm.

Regarding the large length of the rim, it is not mandatory to shape the respective rims of the anchoring openings inwardly in the same extension. It has been found, that it is sufficient to provide some projecting rim portions, which are reshaped further inwards towards the anchoring opening, which alternate with rim portions, which are less reshaped inwardly.

The invention claimed is:

1. A method for producing a brush, which comprises a bristle carrier made from a thermoplastic resin having a front side and a back side and at least one opening, the at least one opening does not extend completely through the bristle carrier, the at least one opening being encompassed by a rim at the front side, in which at least one bristle made of thermoplastic resin is inserted and anchored therein without using an anchor, so that it protrudes from the front side of the bristle carrier, characterized by the following steps:
    the at least one bristle is accommodated in a receiving opening of a tool part,
    the at least one bristle is inserted into the at least one opening in the bristle carrier, which has been formed during producing the bristle carrier, with the fastening end thereof, while the least one bristle is still located in the receiving opening,
    the distance of the tool part to the bristle carrier is reduced, so that a front face of the tool part opposed to the front side of the bristle carrier contacts the front side of the bristle carrier,
    the front side of the bristle carrier is heated to a temperature below the melting temperature of the bristle material and/or below the bristle carrier material, in particular to a maximum 85% in ° C. of the respective melting temperature of the bristle and/or the bristle carrier material,
    the tool part applies a pressure force on the heated bristle carrier, and reshapes the bristle carrier at least in the area of the rim encompassing the opening by reducing the cross-section of the opening in a way, that at least one bristle is embedded and anchored in the opening, and the distance of the tool part to the bristle carrier is enlarged, thus the at least one bristle is pulled out of the receiving opening, the application of the pressure force is carried out in an apparatus, in which the bristle carrier is contacted on the front side thereof by a tool part and on the back side thereof by a holder having a front face, while a pressure force is applied on the bristle carrier.

2. The method according to claim 1, characterized in that the application of the pressure force is carried out in an apparatus, in which the bristle carrier is contacted on the front side thereof by a tool part and on the back side thereof by a holder, while a pressure force is applied on the bristle carrier, wherein the apparatus is moved to stop during application of the pressure force, thus the front faces of the holder and the tool part are in contact with each other at their complete surfaces.

3. The method according to claim 2, characterized in that after an application time of a pressure, the tool part and the holder are removed from each other in a way, that a ventilation gap is created between the front side and the tool part, and that the unit of bristle carrier and of the at least one bristle remains in the apparatus for a predetermined rest period.

4. The method according to claim 3, characterized in that the predefined rest period is at least 1 second.

5. The method according to claim 3, characterized in that the at least one bristle remains in the receiving opening during the complete rest period.

6. The method according to claim 3, characterized in that, that the height of the ventilation gap is larger or equal 1 mm, when measured in the movement direction of the apparatus, and/or the ventilation gap is kept at a constant value during the rest period.

7. The method according to claim 3, characterized in that during the rest period cooling air is blown via the ventilation gap to the front side of the bristle carrier.

8. The method according to claim 3, characterized in that the bristle carrier remains in the holder during the rest period.

9. The method according to claim 2, characterized in that after a feed motion of tool part and bristle carrier relative to each other, which is completed by reaching a closed position of the apparatus, the pressure force is applied on the bristle carrier in the closed position during a predetermined dwell time, wherein the dwell time is at least 1 second.

10. The method according to claim 9 characterized in that the bristle carrier is heated on the front side thereof during the dwell time, in particular in addition during the feed motion.

11. The method according to claim 9, characterized in that pressure is applied on the bristle carrier between the front side and the back side during an application time of at least 4 seconds, in particular at least 5 seconds, wherein the application time equals the dwell time plus a period of time during the feed motion, which period of time is preferably at least 3 seconds, where the front side is contacted by the tool part and the back side is contacted by the holder at the same time.

12. The method according to claim 11, characterized in that the free end of the at least one bristle is not supported at least during the dwell time.

13. The method according to claim 9, wherein the pressure force is applied on the bristle carrier in the closed position during a predetermined dwell time, wherein the dwell time is at least 1.5 seconds, and a maximum 3 seconds, in particular a maximum 2.5 seconds.

14. The method according to claim 2, characterized in that the free end of the at least one bristle is supported in the apparatus on the front face thereof.

15. The method according to claim 14, characterized in that the support is removed before application of the pressure force or during the feed motion of the apparatus after contacting the front side and the back side of the bristle carrier by the tool part and the holder, respectively, and at least a last phase during application of the pressure force is carried out without the support.

16. The method according to claim 1, characterized in that the cross-section of the at least one bristle and the cross-section of the associated receiving opening are aligned in a way that at least the one bristle is clamped into the receiving opening and is configured to be positioned axially by means of the clamping.

17. The method according to claim 1, characterized in that the at least one bristle or a complete bristle tuft has a thickened fastening end generated by thermal reshaping of the bristle material, wherein when using a bristle tuft, the bristles of the bristle tuft are fused with each other by thermal reshaping.

18. The method according to claim 1, characterized in that the at least one anchoring opening is filled with at least one single bristle, which is pre-manufactured from an elastomer material, in particular thermoplastic elastomer (TPE), and the bristle is anchored in the anchor opening by reshaping the bristle carrier, in particular wherein the single pre-manufactured bristle has a maximum wall thickness, which is larger than 0.6 mm, further in particular larger than 0.9 mm, when measured in the cross-section thereof.

19. The method according to claim 18, characterized in that the single pre-manufactured bristle includes a thickened fastening end, by means of which it is inserted into the anchoring opening and which is encompassed by the reshaped rim of the anchoring opening of the bristle carrier, in particular wherein the thickened fastening end has the shape of a flat cylinder and/or the single pre-manufactured bristle is a multi-component injection moulded part, wherein preferably the thickened fastening end is made of another, preferably harder material, for example polypropylene, than at least the outer surface of the single pre-manufactured bristle outside of the anchoring opening, preferably than the complete rest of the single pre-manufactured bristle.

20. The method according to claim 18, characterized in that, that a plurality of anchoring openings are provided in the bristle carrier, wherein at least one anchoring opening is provided only with the single pre-manufactured bristle and at least one further anchoring opening is provided with a pre-manufactured bristle tuft, so that the brush comprises on the one hand at least a single bristle, which is thicker than the bristles of the bristle tufts, and on the other hand comprises at least one bristle tuft, in particular wherein the single bristle protrudes with its free end thereof at least to the free end of the bristle tuft, when viewed from the side.

21. The method according to claim 1, characterized in that after reshaping, the wall, which defines the anchoring opening in the bristle carrier, abuts only in sections on the fastening end of the at least one bristle or the at least one complete bristle tuft, which bristle or bristle tuft is placed in the anchoring opening.

22. The method according to claim 21, characterized in that the reshaping is carried out only in the region of the rim of the anchoring opening, which is located in the region of the mouth of the anchoring opening, thus regarding the completed brush, the wall of the anchoring opening does not clamp the fastening end of the at least one bristle or of the at least one complete bristle tuft over a depth of at least 0.8 mm, starting from the bottom of the anchoring opening, and/or is not reshaped over a depth of at least 0.8 mm, starting from the bottom of the anchoring opening.

23. The method according to claim 1, characterized in that the at least one bristle or the at least one complete bristle tuft includes a thickened fastening end, and the rim of the anchoring opening is reshaped and the anchoring opening is constricted in the region of the mouth thereof in a way that the anchoring opening is enlarged towards the bottom and the reshaped rim engages the thickened fastening end from behind in the pull-out direction.

24. The method according to claim 23, characterized in that the thickened fastening end is clamped starting from the end thereof adjacent to the front side of the bristle carrier in the axial direction in the anchoring opening only to a maximum of 50% of its complete axial length.

25. The method according claim 23, characterized in that the reshaped rim of the anchoring opening engaging with the thickened fastening end from behind has an axial dimension of 0.5-0.3 mm, in particular 0.6-0.9 mm.

26. The method according to claim 1, characterized in that a bristle tuft is fastened in the anchoring opening and the rim of the anchoring opening is reshaped in a way, that the rim of the bristle tuft is compacted in a region, in which the bristles are arranged next to one another, thus the bristle tuft has a smaller cross-section than after inserting the bristle tuft in the anchoring opening and before reshaping.

27. The method according to claim 1, characterized in that-the application of the pressure force is performed in an apparatus, in which the bristle carrier is contacted on the front side thereof by a tool part and at the back side thereof by a holder having a front face, while the pressure force is applied on the bristle carrier, that the back side of the bristle carrier is defined by an injection-moulded elastomer, and the holder includes a recess for receiving the bristle carrier provided with the overmould, wherein the recess is formed in particular in a complementary way to the shape of the bristle carrier including the overmould.

28. Method according to claim 27, characterized in that a counter force from the holder is completely transferred to the bristle carrier via the elastomer during reshaping.

29. The method according to claim 1, characterized by the following steps: the tool part is heated, so that the front face of the tool part opposite of bristle carrier is heated to a temperature below the melting temperature of the bristle material and/or of the bristle carrier material, in particular to a maximum of 85% in ° C. of the respective melting temperature of the bristle and/or bristle carrier material, and the tool part is moved in relation to the bristle carrier, so that the tool part contacts the bristle carrier and heats it.

30. The method according to claim 1, characterized by the following steps: a front face of the tool part opposite to the bristle carrier is heated to a predefined temperature, which is in the range between the ambient temperature and 210° C., preferably 150° C., and the tool part is moved relative to the bristle carrier, so that the tool part contacts the bristle carrier and heats it, however without melting the bristle carrier and the at least one bristle.

31. The method according to claim 1, characterized in that the thermoplastic resin is selected from a group consisting of polyester, in particular polyethylene terephthalate (PET), preferably BR003, and polybutylene terephthalate (PBT), polypropylene (PP), polycarbonate (PC), polyamide (PA), polyvinyl acetate (PVA), polyethylene (PE), acrylnitrile-butadiene-styrene-copolymer (ABS), and styrene-acrylnitrile-copolymer (SAN).

32. The method according to claim 1, characterized in that the tool part is heated before it contacts the bristle carrier, in particular to the predetermined maximum operating temperature thereof, and/or characterized in that the bristle carrier is heated by the tool part after inserting the at least one bristle.

33. The method according to claim 1, characterized in that the tool part heats the bristle carrier in the region of the contact surface by means of the tool part during the feed motion of the tool part to the bristle carrier and/or during contacting the bristle carrier to a temperature, which is less than the melting temperature of the bristle carrier material, and which is preferably higher or equal to the glass transition temperature of the bristle carrier material, in particular for a bristle carrier material having a glass transition temperature of higher or equal 300° K is at maximum 15% above the glass transition temperature in ° K, and for a bristle carrier material having a glass transition temperature of less than 300° K is at maximum 50% above the glass transition temperature in ° K.

34. The method according to claim 1, characterized in that in a first phase of the feed motion relative to the bristle carrier, the tool part heats the bristle carrier at least in the region of the rim encompassing the anchoring opening to a temperature above a threshold temperature, which for a bristle carrier material having a glass transition temperature higher or equal to 300° Kelvin, is 40% in ° C., in particular 20% in ° C. below the glass transition temperature of the bristle carrier material or which equals the ambient temperature for a bristle carrier material having a glass transition temperature of below 300° K, before the tool part reshapes the rim in a second phase of the feed motion and the rim presses against the at least one bristle.

35. The method according to claim 1, characterized in that the at least on bristle is first inserted into the receiving opening before the tool part contacts the bristle carrier, in particular before the bristle carrier is heated to a temperature above a threshold temperature at least in the region of the rim encompassing the anchoring opening, which for a bristle carrier material having a glass transition temperature of above or equal 300° K corresponds to 60% in ° C., in particular 80% in ° C., of the glass transition temperature of the bristle carrier material, or which corresponds to the ambient temperature for a bristle carrier material having a glass transition temperature of less than 300° K.

36. The method according to claim 1, characterized in that the at least one bristle is first inserted into the receiving opening, before at least the rim of the anchoring opening is heated to a temperature, which is at least 30° C. above the ambient temperature, in particular before the rim of the anchoring opening inside the anchoring opening is heated by the tool part above the ambient temperature.

37. The method according to claim 1, characterized in that the tool part is heated in the complete contact area, in which the tool part contacts the bristle carrier, wherein the tool part contacts the complete front side facing the tool part, but at least at minimum 70% of the front side, and applies pressure on it.

38. The method according to claim 1, characterized in that the bristle carrier includes a back side which is not heated by the tool part during anchoring.

39. The method according to claim 1, characterized in that the tool part heats the bristle carrier on the front face thereof at least while applying pressure on the bristle carrier.

40. The method according to claim 1, characterized in that the bristle carrier includes a plurality of anchoring openings and the tool part includes a plurality of receiving openings, which are aligned towards the associated anchoring openings, respectively, and that a plurality of bristle tufts, which are placed in the receiving openings thereof, are inserted into the associated anchoring openings, preferably at the same time, and the tool part heats the rims of the anchoring openings at the same time and closes them by applying pressure on the front side of the bristle carrier at the same time and thus anchors the bristle tufts.

41. The method according to claim 1, characterized in that the feed motion of the tool part relative to the bristle carrier is controlled by pressure and time or is controlled by pressure and path.

42. The method according to claim 1, characterized in that the tool part applies a preferably constant pressure force on the bristle carrier for a predetermined period of time starting at the time of contacting the bristle carrier.

43. The method according to claim 1, characterized in that the feed motion and/or the pressure applied by the tool part relative to or on the bristle carrier is non-linearly over the course of time starting with the contact of the bristle carrier by the tool part up to reaching the maximum feed path, wherein a first phase of the feed motion is slower or faster than a later second phase or the pressure is respectively lower or higher than in a later second phase.

44. The method according to claim 1, characterized in that during insertion in the anchoring opening, the fastening end of the at least one bristle or of a complete bristle tuft is smaller than the cross-section of the anchoring opening, in particular by a maximum of 0.3 mm, further preferred by a maximum of 0.15 mm.

45. The method according to claim 1, characterized in that the at least one anchoring opening is a blind hole, in particular having a depth of maximum 4 mm, further in particular maximum 2.7 mm, and/or characterized in that the anchoring opening is reshaped and constricted only to a depth of at least 85%, in particular maximum 70% of the total depth thereof.

46. The method according to claim 1, characterized in that the tool part applies a pressure of at least 200 bar, in particular at least 400 bar, on the bristle carrier.

47. The method according to claim 1, characterized in that the at least one anchoring opening is preferably formed without a protruding collar, in particular is formed flat, before impingement of the bristle carrier by the tool part in the region of the mouth of the anchoring opening.

48. The method according to claim 1, characterized in that the at least one anchoring opening comprises a rim portion on the inside thereof extending inclined to the front side thereof opposed to the tool part, wherein before impingement of the bristle carrier by the tool part, the bristle carrier includes on the face side rim in the region of the inclined rim portion a protrusion protruding opposite of the front side towards the tool part and which apart from that preferably has a flat front side.

49. The method according to claim 1, characterized in that the tool part is a magazine, which is loaded with the at least one bristle or the at least one bristle tuft, wherein after loading the at least one bristle or the at least one bristle tuft protrudes from the magazine with the fastening end thereof and the fastening end is heated, and thus forms a thickening.

50. The method according to claim 49, characterized in that the thickening is subsequently actively cooled, before the fastening end is inserted into the anchoring opening, in particular by an active air flow or a cold chamber.

51. The method according to claim 1, characterized in that a plurality of bristle tufts are received in the tool part in the respective associated receiving openings and are anchored in associated anchoring openings, preferably at the same time.

52. The method according to claim 1, wherein the tool part is heated, so that the front face of the tool part opposite of the bristle carrier is heated to a temperature, which is a maximum 140° C., in particular a maximum 130° C., wherein the front face of the bristle carrier is heated to 75-95° C., in particular 80-90° C., when PET is used as bristle carrier material, and when PP is used as bristle carrier material, preferably a PP material having a melt flow index (WI) of 6-35, preferably 10-15, the front face is heated to 105-125° C., in particular 110-120° C.

53. The method according to claim 1, characterized in that at least one resilient cleaning element made of an elastomer, in particular TPE, which protrudes at the front side thereof, is injection-moulded and fastened to the bristle carrier before or at the time of fastening the at least one bristle, wherein the cleaning element is arranged on the rim of the bristle carrier and/or inwards of the rim between bristles or bristle tufts.

54. The method according to claim 1, characterized in that in the same bristle carrier a plurality of bristle tufts are anchored, wherein at least one bristle tuft is made of bristles from another material having another melting temperature as the bristles of the at least one further bristle tuft, wherein the bristle tufts consisting of different bristle materials are heated to different temperatures in order to fuse the bristles of the tuft to form a thickened fastening end, in particular wherein the distance between an end of the bristle tuft facing the heating device and the heating device is set in different ways depending on the bristle material, and/or that the heating device heats to different temperatures depending on the bristle material, and/or that various heating devices are used which are heated to different temperatures, which are matched to the bristle material.

55. An apparatus for producing a brush comprising at least one bristle or at least one bristle tuft, which brush includes a bristle carrier having at least one anchoring opening for the at least one bristle or the at least one bristle tuft, characterized in that the apparatus comprises a holder for the bristle carrier and a tool part having at least one receiving opening for the at least one bristle or the at least one bristle tuft, wherein the receiving opening ends on the front face of the tool part facing the bristle carrier, and wherein the tool part includes a heating which heats at least portions of the front face, the heating being adapted and controlled in a way that the front face is heated to a temperature of a maximum 140° C., in particular to a maximum of 130° C. for carrying out a method according to claim 1, characterized in that the apparatus comprises a tool part including at least one receiving opening for at least one bristle or at least one bristle tuft and an opposite holder, wherein tool part and holder are movable towards each other and away from each other, and wherein the tool part is heatable and the holder is provided with an active cooling device.

56. The apparatus according to claim 55, characterized in that the tool part is movable relative to the holder towards and away from it, in particular wherein said feed motion is controlled by pressure and time and/or controlled by pressure and path.

57. The apparatus according to claim 55, characterized in that the apparatus is configured in a way that the tool part may provide a pressure of at least 200 bar, in particular at least 400 bar, on the bristle carrier.

58. The apparatus according to claim 55, characterized in that the tool part is configured as heatable over the complete contact area with the bristle carrier.

59. The apparatus according to claim 55, characterized in that the tool part is a magazine, which is loaded with the at least one bristle or the at least one bristle tufts in a loading station of the apparatus, wherein the at least one bristle or the at least one bristle tuft protrudes from the magazine with the fastening end thereof after loading, wherein a melting station is provided downstream of the loading station, in which the fasting end is heated and thus thickening is formed, wherein when using a bristle tuft, the bristles of the bristle tuft are fused with each other by thermal reshaping.

60. The apparatus according claim 55, characterized in that a controller is provided, which controls the feed motion of the tool part relative to the bristle carrier and the heating operation of the tool part in a way, that the tool part is heated before it contacts the bristle carrier, in particular to a predetermined maximum operating temperature, and/or which carries out a control thereof in a way, that the bristle carrier is only heated after inserting the at least one bristle by the tool part.

61. The apparatus according to claim 60, wherein the controller is programmed in a way that the tool part is heatable to such a temperature and the tool part is moved to the bristle carrier such, that the tool part heats the bristle carrier in the area of the contact surface with the tool part during the feed motion of the tool part to the bristle carrier and/or during contacting the bristle carrier to a temperature below the melting temperature of the material of the bristle carrier and preferably higher or equal to the glass transition temperature of the material of the bristle carrier, in particular wherein the controller is configured to be programmed in a way that for a bristle carrier material having a glass transition temperature of higher or equal 300° K, the temperature of the tool part is set to a maximum 15% above the glass transition temperature in ° K, and for a bristle carrier material having a glass transition temperature of below 300° K is set a maximum 50% above the glass transition temperature in ° K.

62. The apparatus according to claim 55, characterized in that the apparatus comprises a plurality of stations, wherein an injection moulding station for producing the bristles carrier is provided upstream of the station including the holder and the tool part, wherein an injection mould half is provided in the injection moulding station, the injection mould half having at least one protrusion protruding into an injection cavity, the at least one protrusion being rigidly mounted on the injection mould half or is part of it, and wherein the protrusion generates the anchoring opening adapted as blind hole, in particular wherein the injection mould halves are configured without sliders and/or in particular wherein the injection station is a multi-component injection mould station.

63. The apparatus according to claim 55, characterized in that it comprises at least an electric motor, in particular a servo motor, for applying a pressure force.

64. The apparatus according to claim 63, characterized in that a shared electric motor is configured to apply the pressure force to a plurality of bristle carriers.

65. The apparatus according to claim 63, characterized in that a plurality of electric motors are provided for application of the pressure force and each electric motor moves a tool part and a holder relative to each other, wherein at least one bristle carrier is received between the tool part and the holder.

66. The apparatus according to claim 55, characterized in that the apparatus comprises the controller, which is programmed in such a way, that during operation the tool part is permanently heated to the desired temperature for applying pressure on the bristle carrier.

67. A holder for an apparatus according to claim 55, characterized in that the holder is provided with at least one cooling channel.

68. The holder according to claim 67, characterized in that the holder comprises recesses for a plurality of bristle carriers.

69. The holder according to claim 67, characterized in that for each bristle carrier the holder comprises a recess, which is formed complementarily to the bristle carrier.

70. A method for producing a brush, which comprises a bristle carrier made from a thermoplastic resin having a front side and a back side and at least one opening, the at least one opening does not extend completely through the bristle carrier, the at least one opening being encompassed by a rim at the front side, in which at least one bristle made of thermoplastic resin is inserted and anchored therein without using an anchor, so that it protrudes from the front side of the bristle carrier, characterized by the following steps:
   the at least one bristle is accommodated in a receiving opening of a tool part,
   the at least one bristle is inserted into the at least one opening in the bristle carrier, which has been formed during producing the bristle carrier, with the fastening end thereof, while the least one bristle is still located in the receiving opening,
   the distance of the tool part to the bristle carrier is reduced, so that a front face of the tool part opposed to the front side of the bristle carrier contacts the front side of the bristle carrier,
   the front side of the bristle carrier is heated to a temperature below the melting temperature of the bristle material and/or below the bristle carrier material, in particular to a maximum 85% in ° C. of the respective melting temperature of the bristle and/or the bristle carrier material,
   the tool part applies a pressure force on the heated bristle carrier, and reshapes the bristle carrier at least in the area of the rim encompassing the opening by reducing the cross-section of the opening in a way, that at least one bristle is embedded and anchored in the opening,
   the back side of the bristle carrier is actively cooled, while the pressure force is applied on the bristle carrier, and
   the distance of the tool part to the bristle carrier is enlarged, thus the at least one bristle is pulled out of the receiving opening,
   the application of the pressure force is carried out in an apparatus, in which the bristle carrier is contacted on the front side thereof by a tool part and on the back side thereof by a holder having a front face, while a pressure force is applied on the bristle carrier.

71. The method according to claim 70, characterized in that the back side of the bristle carrier is cooled, in particular in a way that during application of the pressure force the temperature of the back side is at maximum 25° C.

72. The method according to claim 70, characterized in that a holder contacts the back side of the bristle carrier during application of the pressure force, and applies a counterforce to the bristle carrier and cools the bristle carrier, wherein the holder is liquid-cooled.

73. The method according to claim 72, characterized in that the tool part has a planar front face, which faces the bristle carrier, and/or a geometry, which is not configured to protrude into the anchoring opening, and/or characterized in that a separation plane is provided between the holder and the tool part when the holder and the tool part are contacting each other, the holder starting from the separation plane of the holder the tool part having a depression, which is adapted to the shape of the bristle carrier, wherein the depression has preferably such a depth, that the separation plane is positioned at the height of the side surface of the bristle carrier and adjacent to a rounded transition between side surface and front side of the bristle carrier.

74. The method according to claim 73, characterized in that the overall thickness of the bristle carrier is reduced by applying heat and pressure.

75. The method according to claim 70, characterized in that at least portions of a side surface connecting the front side and the back side of the bristle carrier are actively cooled during application of the pressure force on the bristle carrier.

76. A method for producing a brush, which comprises a bristle carrier made from a thermoplastic resin having a front side and a back side and at least one opening, the at least one opening does not extend completely through the bristle carrier, the at least one opening being encompassed by a rim at the front side, in which at least one bristle made of thermoplastic resin is inserted and anchored therein without using an anchor, so that it protrudes from the front side of the bristle carrier, characterized by the following steps:

the at least one bristle is accommodated in a receiving opening of a tool part, the at least one bristle is inserted into the at least one opening in the bristle carrier, which has been formed during producing the bristle carrier, with the fastening end thereof, while the least one bristle is still located in the receiving opening, the distance of the tool part to the bristle carrier is reduced, so that a front face of the tool part opposed to the front side of the bristle carrier contacts the front side of the bristle carrier, the front side of the bristle carrier is heated to a temperature below the melting temperature of the bristle material and/or below the bristle carrier material, in particular to a maximum 85% in ° C. of the respective melting temperature of the bristle and/or the bristle carrier material, the tool part applies a pressure force on the heated bristle carrier, and reshapes the bristle carrier at least in the area of the rim encompassing the opening by reducing the cross-section of the opening in a way, that at least one bristle is embedded and anchored in the opening, the distance of the tool part to the bristle carrier is enlarged, thus the at least one bristle is pulled out of the receiving opening, the application of the pressure force is carried out in an apparatus, in which the bristle carrier is contacted on the front side thereof by a tool part and on the back side thereof by a holder having a front face, while a pressure force is applied on the bristle carrier, and an air gap is provided at least in sections between the wall and the at least one bristle in the region of the bottom or adjacent to the bottom of the opening in the bristle carrier.

* * * * *